(12) United States Patent
Kim et al.

(10) Patent No.: US 10,774,914 B2
(45) Date of Patent: Sep. 15, 2020

(54) AUTOMOTIVE TRANSMISSION

(71) Applicant: SL Corporation, Daegu (KR)

(72) Inventors: Daehyung Kim, Gyeongsan-si (KR);
Seongguk Bae, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/566,084

(22) Filed: Sep. 10, 2019

(65) Prior Publication Data
US 2020/0208725 A1 Jul. 2, 2020

(30) Foreign Application Priority Data
Dec. 28, 2018 (KR) .......................... 10-2018-0171612

(51) Int. Cl.
| | | |
|---|---|---|
| *F16H 51/02* | (2006.01) | |
| *F16H 59/10* | (2006.01) | |
| *F16H 59/08* | (2006.01) | |
| *F16H 59/02* | (2006.01) | |

(52) U.S. Cl.
CPC .............. *F16H 51/02* (2013.01); *F16H 59/10* (2013.01); *F16H 2059/026* (2013.01); *F16H 2059/081* (2013.01); *F16H 2059/082* (2013.01)

(58) Field of Classification Search
CPC .. F16H 51/02; F16H 59/10; F16H 2059/0221; F16H 2059/081; F16H 2059/082; F16H 2059/026
See application file for complete search history.

(56) References Cited

U.S. PATENT DOCUMENTS

| | | | |
|---|---|---|---|
| 2019/0162295 A1* | 5/2019 | Babu | ........................ F16H 59/08 |
| 2019/0195339 A1* | 6/2019 | Kim | ....................... F16H 59/105 |

\* cited by examiner

*Primary Examiner* — Thomas C Diaz
(74) *Attorney, Agent, or Firm* — Nelson Mullins Riley & Scarborough LLP; Kongsik Kim, Esq.

(57) ABSTRACT

An automotive transmission is provided. The automotive transmission includes a knob, a lever coupled to the knob and moved up or down along a first direction between a first position and a second position, and a lever coupling unit coupled to the lever and moved together with the lever when the lever is moved along the first direction. In particular, the lever coupling unit is operated in a first transmission mode at the first position and operated in a second transmission mode at the second position. The automotive transmission further includes a driving unit which provides a driving force to move the lever coupling unit.

19 Claims, 27 Drawing Sheets

(a)

(b)

AUTOMOTIVE TRANSMISSION

CROSS-REFERENCE TO RELATED APPLICATION

This application claims the benefit of priority to Korean Patent Application No. 10-2018-0171612, filed on Dec. 28, 2018, the disclosure of which is incorporated herein by reference in its entirety.

BACKGROUND

1. Technical Field

The present disclosure relates to an automotive transmission, and more particularly, to an automotive transmission that enables a driver to select a gear position.

2. Description of the Related Art

An automotive transmission adjusts a gear ratio based on vehicle speed to keep the rotational speed of an engine constant, and a driver operates a shift lever to adjust the gear ratio of the transmission.

Transmission modes of the automotive transmission include a manual transmission mode in which a gear position is manually changed by the driver and an automatic transmission mode in which the gear position is automatically changed based the vehicle speed when the driver selects a drive (D) position. In addition, a sports mode transmission, which manually and automatically changes the gear position, is also used. In the sports mode transmission, a manual transmission which allows the driver to manually change the gear position to a higher or lower gear position while primarily operating in the automatic transmission mode may be provided beside an automatic transmission.

A shift lever is exposed inside a vehicle to allow it to be operated by a driver, and most shift levers are installed between a center fascia and a console box of a vehicle. Generally, shift levers are categorized into a joystick type and a rotary type. For example, a joystick type shift lever protrudes outward from a mounting position within the vehicle and is moved forward or backward to select a gear position. Therefore, the joystick type shift lever requires a space that corresponds to its trajectory and requires a design that prevents it from interfering with its surroundings. A rotary type shift lever also protrudes outward from a mounting position within the vehicle, but it protrudes to a less height as compared with the joystick type shift lever. Since the gear position is changed by rotation of the rotary mode shift lever, the space required is reduced, and utilization of the vehicle space is increased.

However, since different drivers have different preferences for the type of the shift lever based on vehicle driving conditions, it is required to develop a way to provide various modes or types from which a driver can select a desired mode or type based on the vehicle driving conditions.

SUMMARY

Aspects of the present disclosure provide an automotive transmission which provides various operation modes to a driver to allow the driver to select a desired operation mode based on vehicle driving conditions.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, an automotive transmission may include a knob; a lever coupled to the knob and configured to be moved up or down in a first direction between a first position and a second position; a lever coupling unit coupled to the lever, moved together with the lever when the lever is moved in the first direction, and operated in a first transmission mode at the first position and operated in a second transmission mode at the second position; and a driving unit which provides a driving force to move the lever coupling unit. The lever coupling unit may further include a bullet portion; and a multi-groove portion which includes a first shift portion and a second shift portion that contact the bullet portion. The bullet portion may be operated on the first shift portion at the first position and may be operated on the second shift portion at the second position.

The multi-groove portion may form a body whose portions intersect in the first direction and a second direction perpendicular to the first direction. The body may include a first shift body which extends in the first direction and forms the first shift portion on an inside of the first shift body, and a second shift body which extends in the second direction from the first shift body and forms the second shift portion on an inside of the second shift body.

The first shift portion may have a predetermined curvature along the first direction on the inside of the first shift body and form a first shift contact surface which includes a plurality of stepped surfaces formed in the second direction, and the second shift portion may have a predetermined curvature along the second direction on the inside of the second shift body and include a plurality of stepped surfaces formed in the first direction to form a second shift contact surface that the bullet portion contacts. The first shift portion may be formed in a 'V' shape in the first direction on the inside of the first shift body to form the first shift contact surface, and the second shift portion may be formed in a 'V' shape in the second direction on the inside of the second shift body to form the second shift contact surface.

The lever may be rotated about the second direction at the first position in the first transmission mode, and may be rotated about the first direction at the second position in the second transmission mode. The bullet portion may be moved along the first shift contact surface while contacting the first shift contact surface in the first transmission mode, and may be moved along the second shift contact surface while contacting the second shift contact surface in the second transmission mode.

The automotive transmission may further include a rotation restricting member which is rotated about the second direction while restricting the rotation of the lever coupling unit about the first direction when the lever coupling unit is disposed at the first position and operated in the first transmission mode. The rotation restricting member may include a rod portion which protrudes in the second direction at a point where the lever and the bullet portion intersect and has a coupling member formed at an end thereof; and a roller portion which forms a coupling groove for accommodating the coupling member in a surface and is rotatable about the rod portion and about the second direction while the rotation of the roller portion about the first direction is restricted.

The coupling member may include a circular head and a seating protrusion which protrudes from the circular head along a diameter of the circular head and makes a surface-contact to at least a portion of an inner surface of the coupling groove.

The automotive transmission may further include a sensing unit which senses the position of the lever and a change in the lever. The sensing unit may include a magnet which is coupled to a mounting groove formed in a surface of the circular head, and a first sensor which senses a change in a magnetic force from the magnet in the first transmission mode. The sensing unit may also sense the position of the lever and a change in the rotation of the lever at the second position. The sensing unit may include a magnet which is coupled to a mounting groove formed in a surface of the circular head, and a second sensor which faces the magnet at the second position and senses a change in a magnetic force from the magnet.

The lever coupling unit may further include a moving body coupled to the lever and moved together with the lever when the lever is moved along the first direction. In particular, the bullet portion and the multi-groove portion may be mounted on one side surface of the moving body, and the driving unit may be connected to the other side surface of the moving body.

The moving body may include, on the one side surface thereof, a seating portion, on which the bullet portion and the multi-groove portion are seated and which forms a space for rotating the bullet portion about the second direction or about the first direction. The seating portion may include a seating groove formed at a center of the moving body in a third direction to accommodate the bullet portion, and coupling grooves which are formed at both ends of the seating groove and at both ends of the moving body. The multi-groove portion may be coupled to each of the coupling grooves.

The seating groove may form a first rotation space in which the bullet portion is configured to be rotated about the second direction of the lever and a second rotation space in which the bullet portion is configured to be rotated about the first direction of the lever.

The driving unit may include an actuator, a lead screw configured to be engaged with the lever coupling unit, and at least one transmission gear portion which transmits a driving force of the actuator to the lead screw.

A moving protrusion may be formed on the second surface of the moving body. The moving protrusion may protrude from a lower surface of the seating portion, may include a threaded surface, which is configured to be engaged with the lead screw, on an inside of the moving protrusion, and may be moved up or down along the first direction based on a rotational direction of the lead screw.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
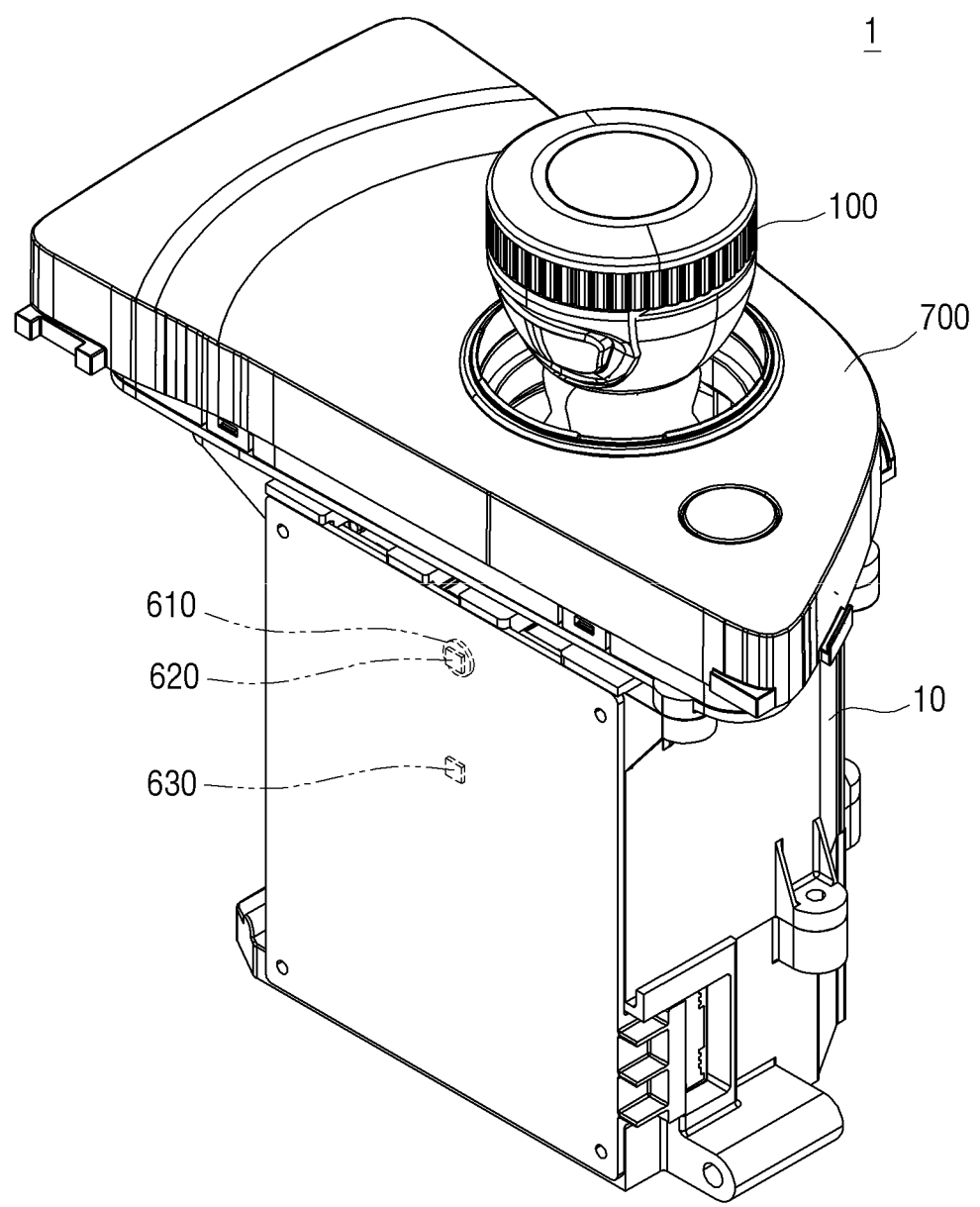
FIG. 1 is a perspective view illustrating the exterior of an automotive transmission according to an exemplary embodiment of the present disclosure in a first transmission mode.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

Therefore, in some exemplary embodiments, well-known processes, well-known structures and well-known technologies will not be specifically described in order to avoid ambiguous interpretation of the present disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, steps, and/or operations, but do not preclude the presence or addition of one or more other elements, steps, operations, and/or groups thereof. As used herein, the term "and/or" includes any and all combinations of one or more of the associated listed items.

Exemplary embodiments of the disclosure are described herein with reference to perspective, cross-section, side and/or schematic illustrations that are illustrations of idealized exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. In addition, each element illustrated in figures of the present disclosure may have been enlarged or reduced for ease of description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present disclosure will be described with reference to the drawings for explaining automotive transmissions according to exemplary embodiments of the present disclosure.

Figure 2:
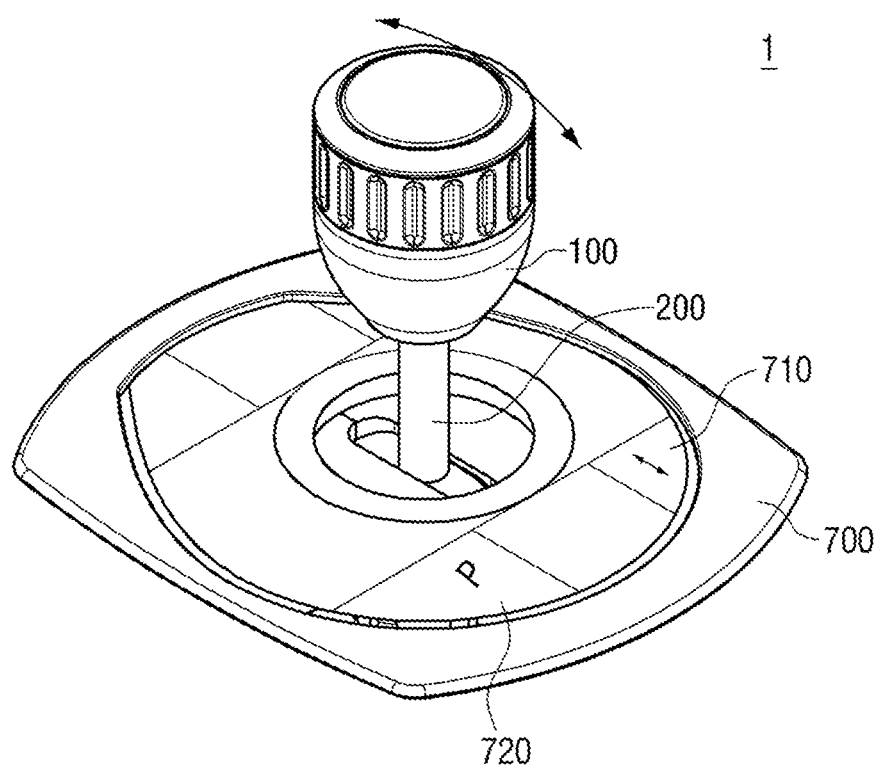
FIG. 2 is a perspective view illustrating a portion exposed in the first transmission mode of the automotive transmission according to the exemplary embodiment of the present disclosure.
Figure 3:
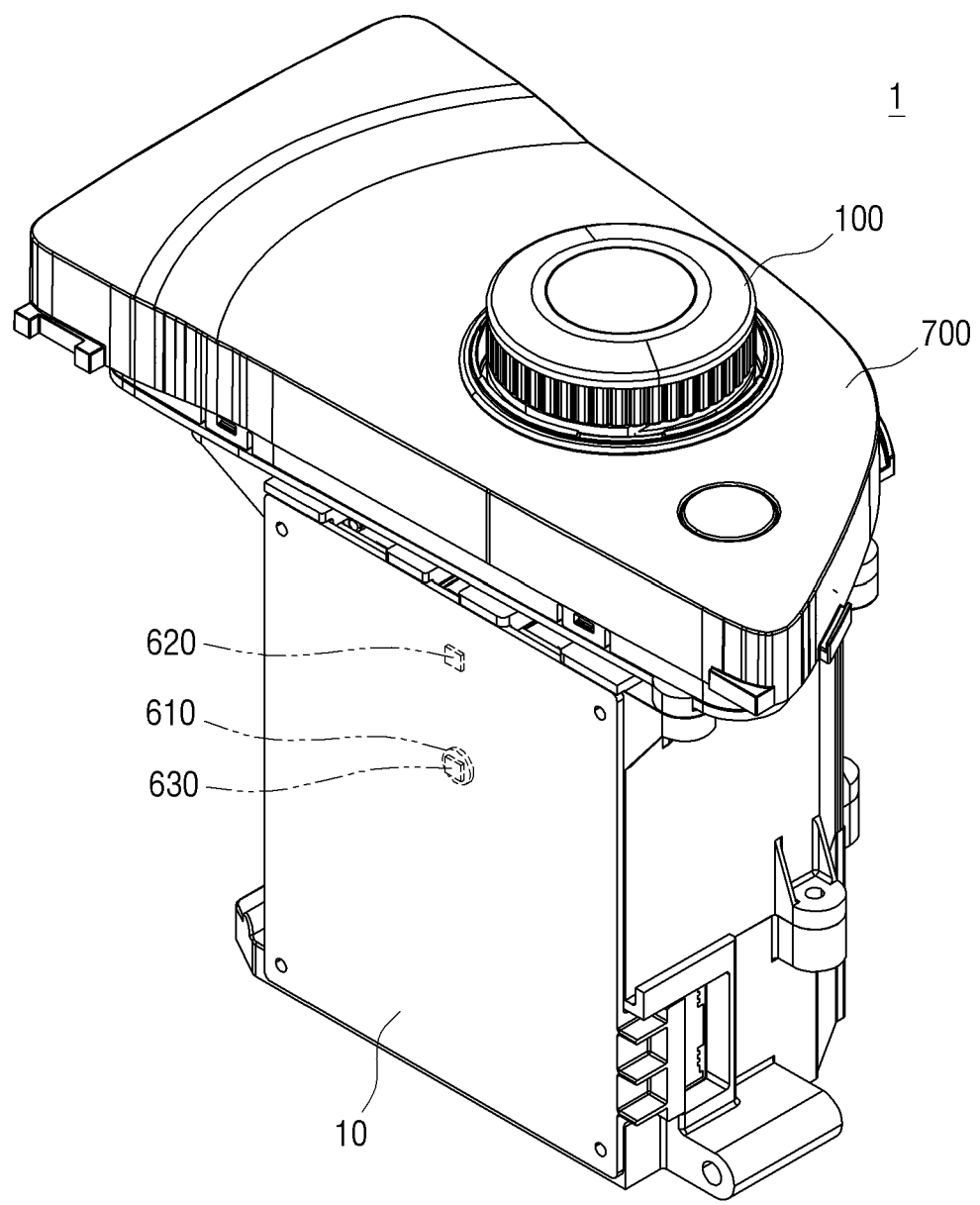
FIG. 3 is a perspective view illustrating the exterior of the automotive transmission according to the exemplary embodiment of the present disclosure in a second transmission mode.
Figure 4:
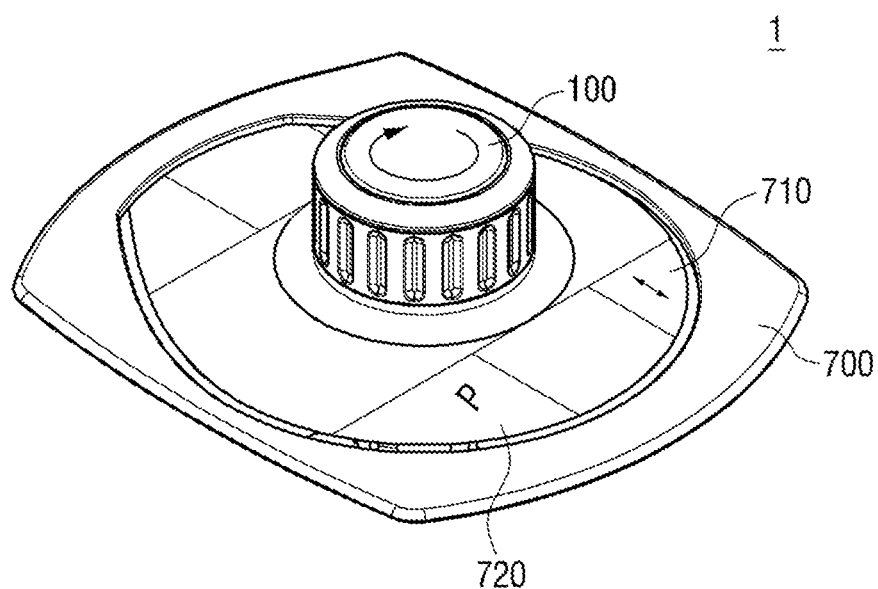
FIG. 4 is a perspective view illustrating a portion exposed in the second transmission mode of the automotive transmission according to the exemplary embodiment of the present disclosure.
Figure 5:
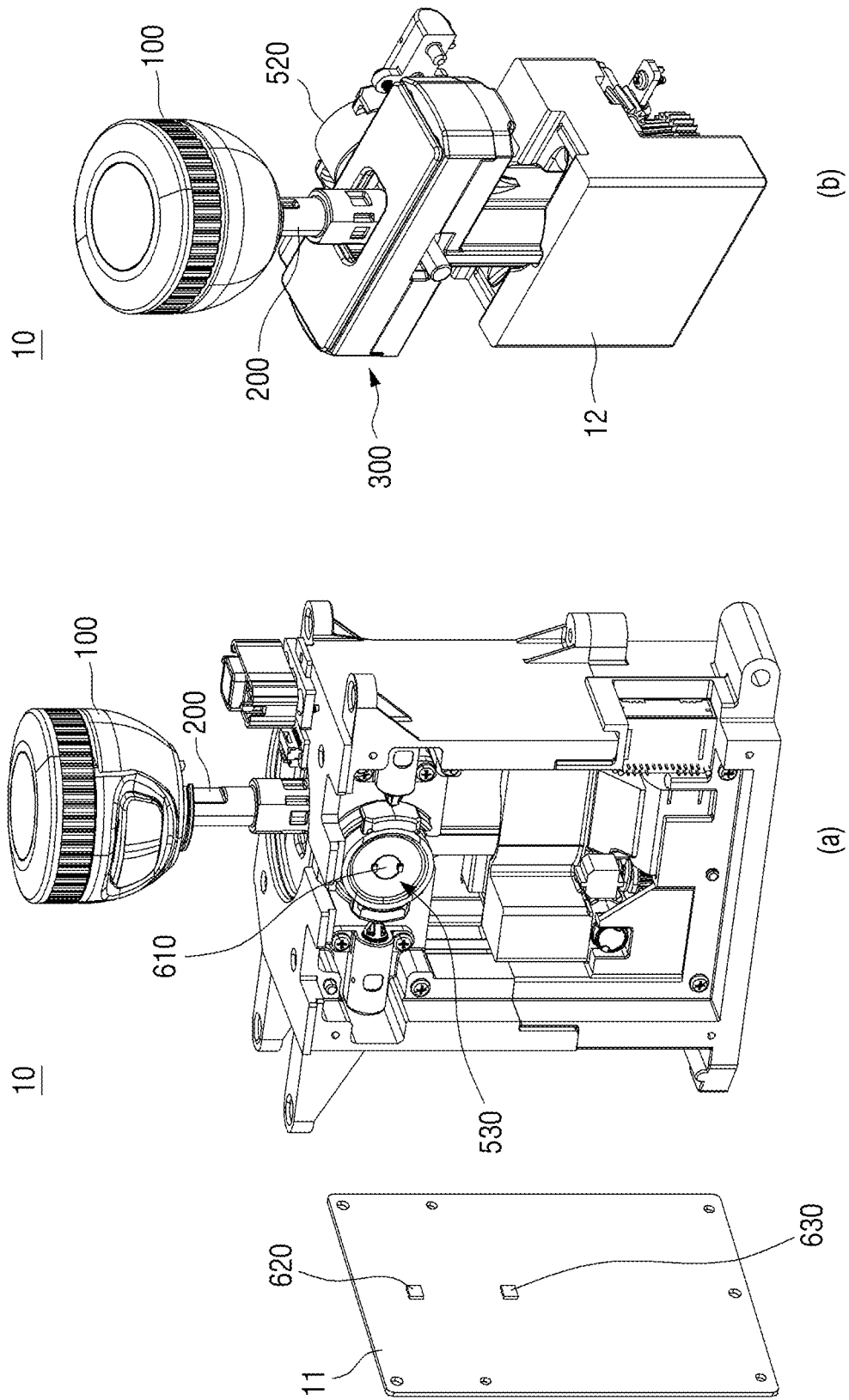
FIG. 5 is a perspective view schematically illustrating the interior of the automotive transmission according to the exemplary embodiment of the present disclosure in one direction and another direction.
Figure 6:
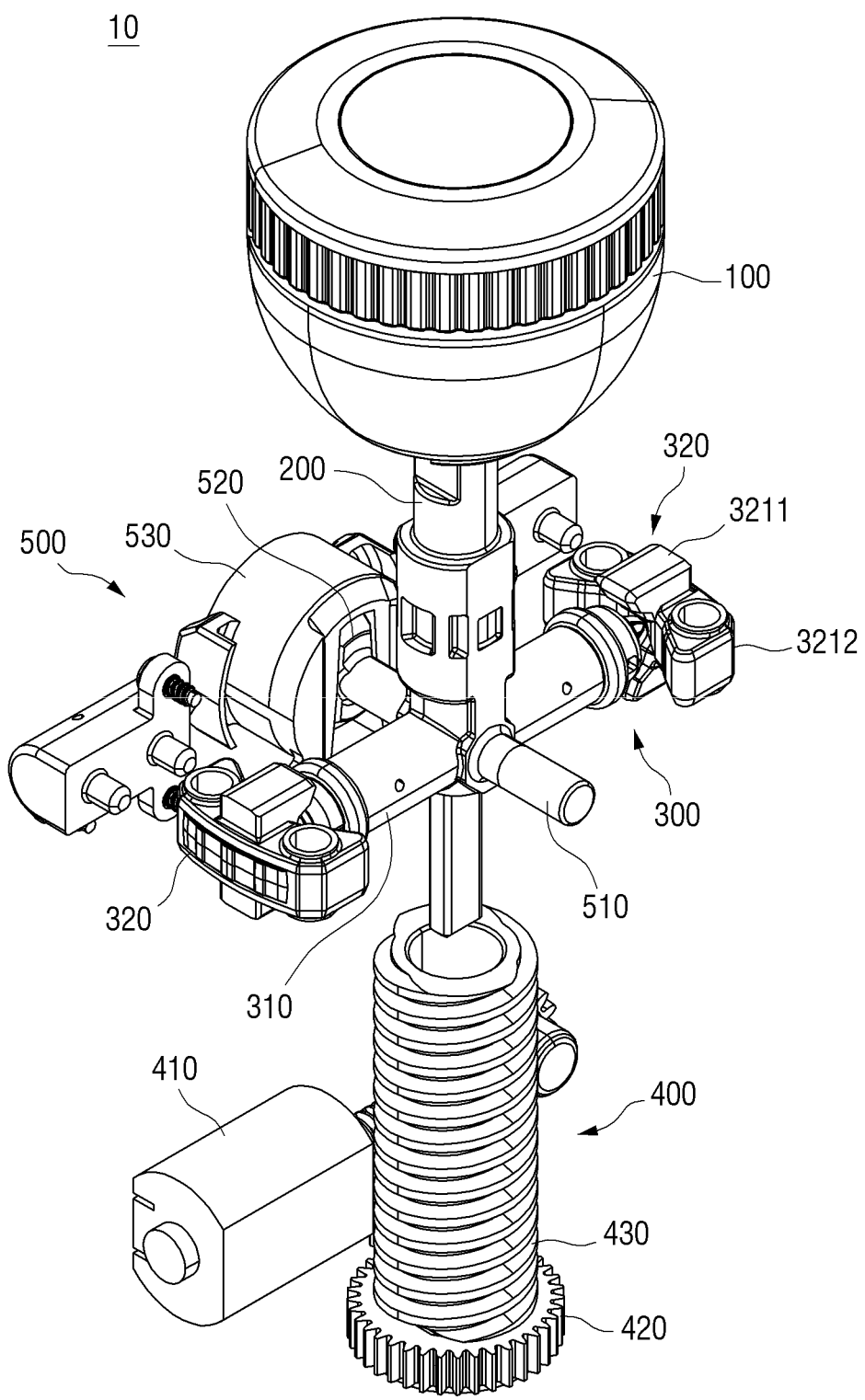
FIG. 6 is a perspective view schematically illustrating internal elements of the automotive transmission according to the exemplary embodiment of the present disclosure.
Figure 7:
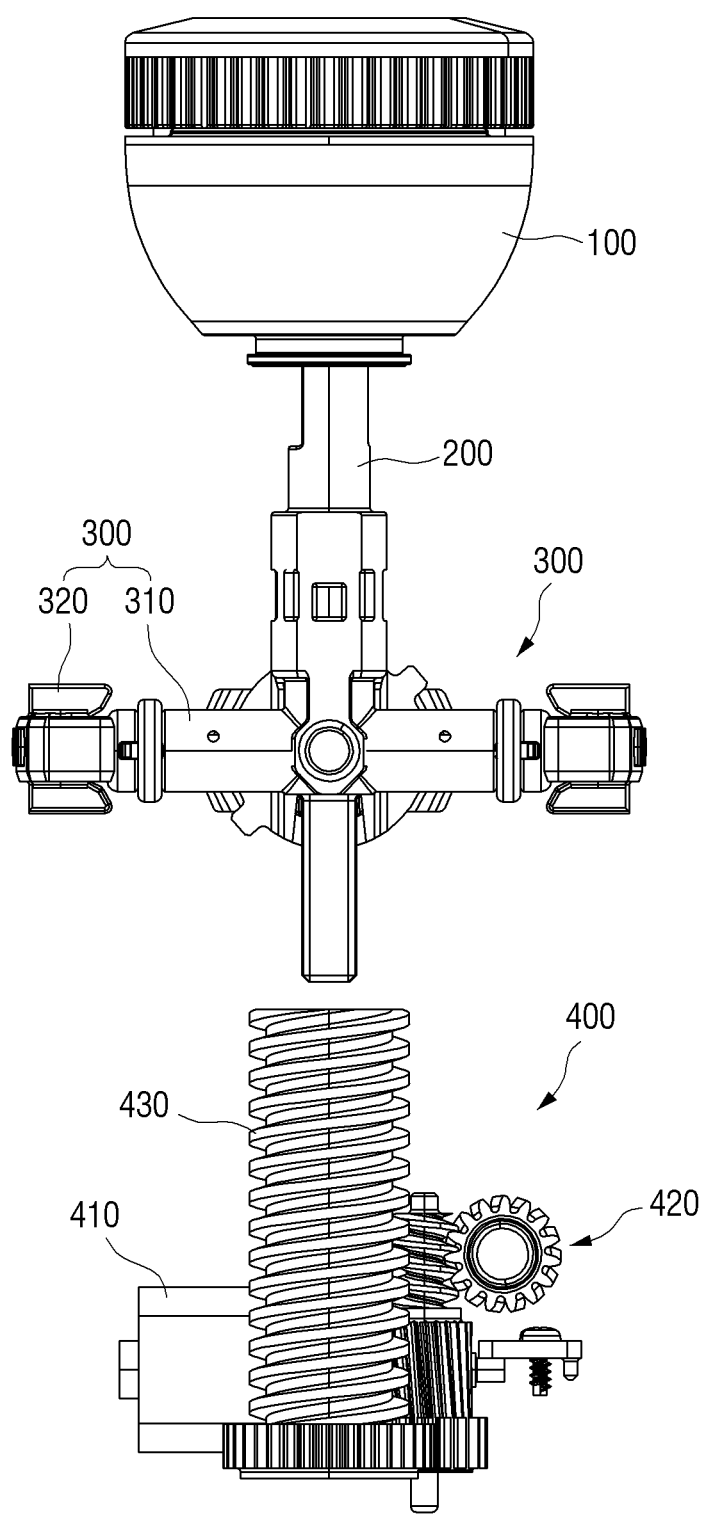
FIG. 7 is a side view schematically illustrating the internal elements of the automotive transmission according to the exemplary embodiment of the present disclosure.
Figure 8:
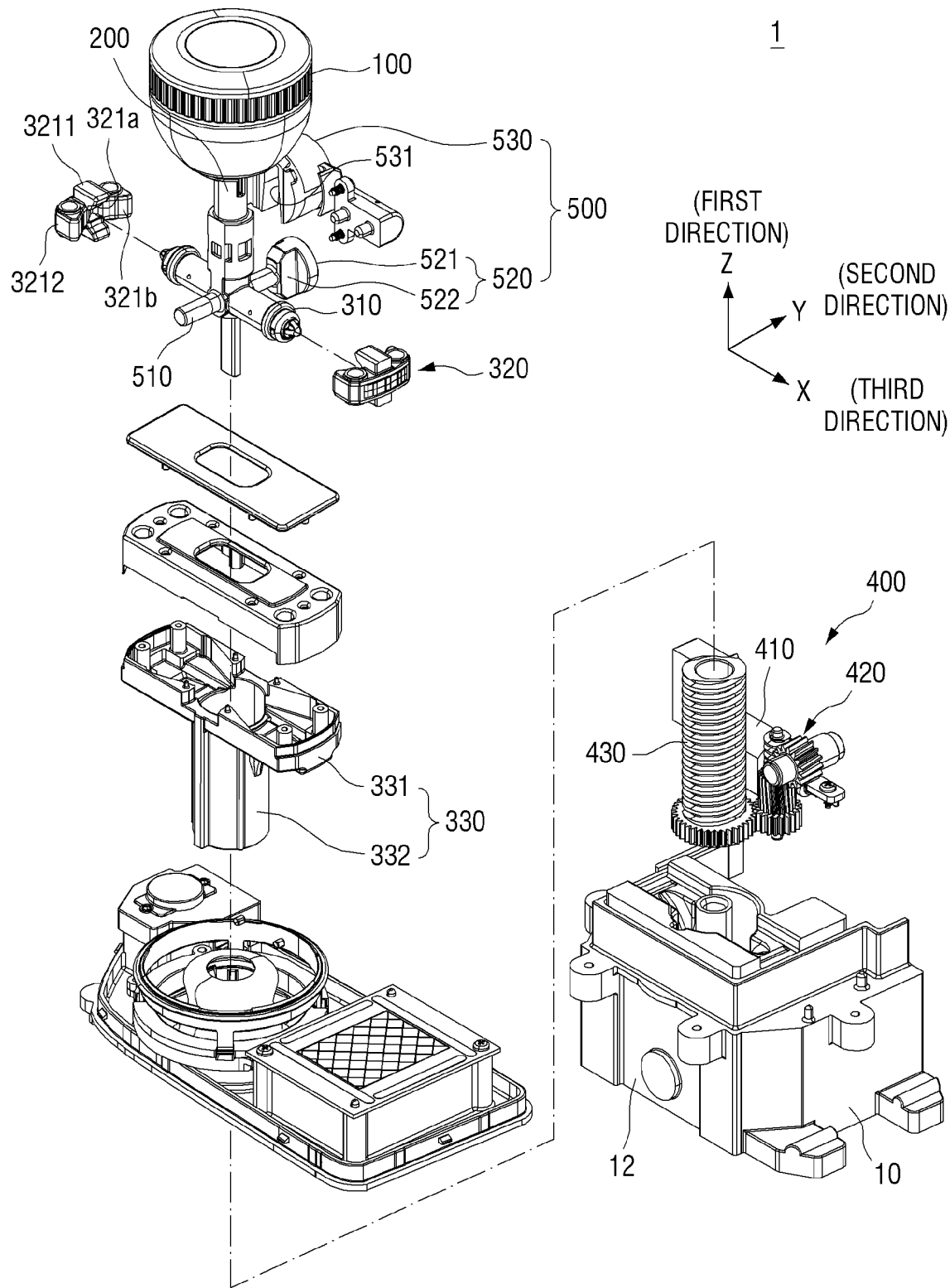
FIG. 8 is an exploded perspective view of the automotive transmission according to the exemplary embodiment of the present disclosure.
Figure 9:
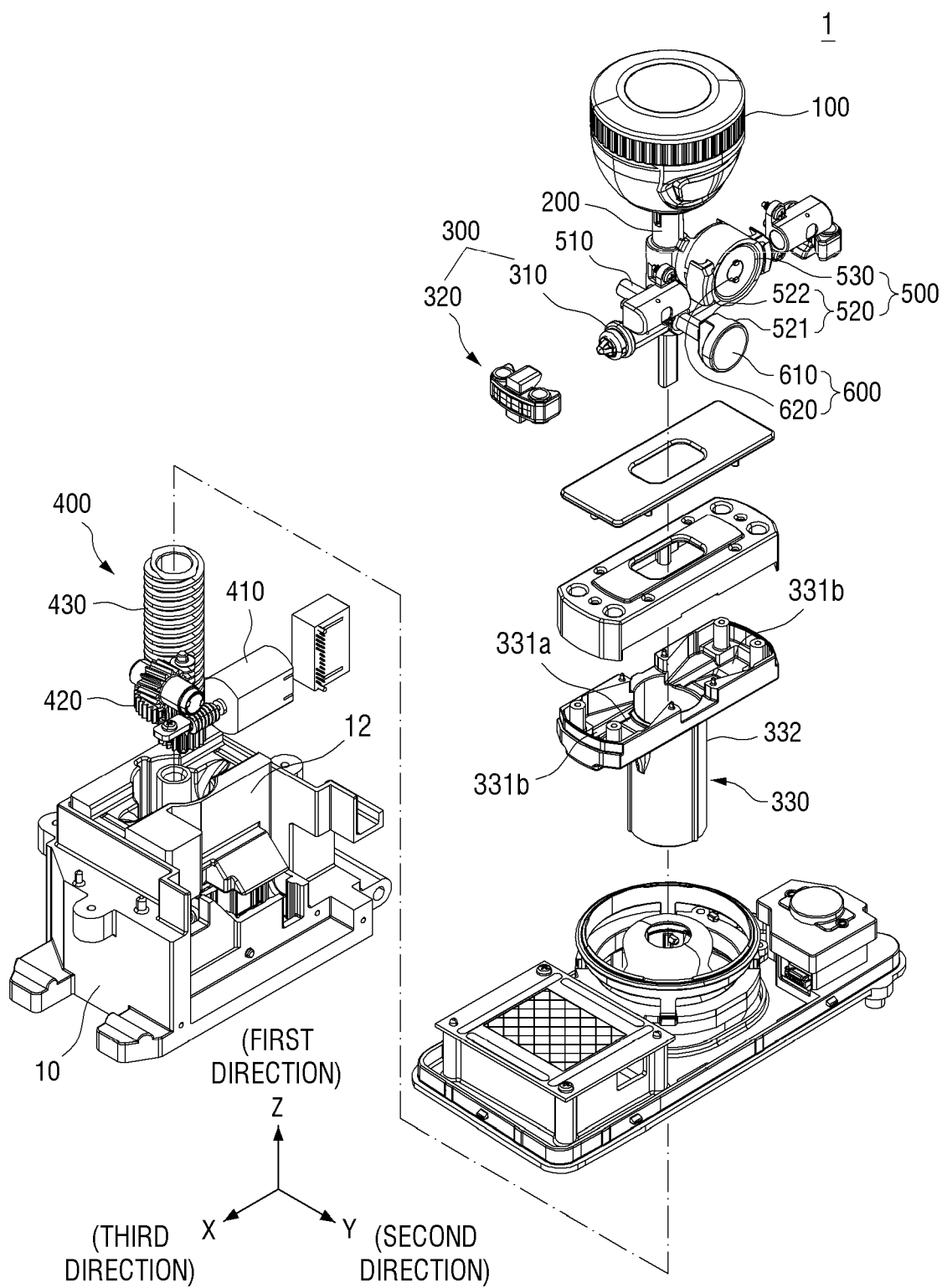
FIG. 9 is an exploded perspective view illustrating the automotive transmission according to the exemplary embodiment of the present disclosure in another direction.
Figure 10:
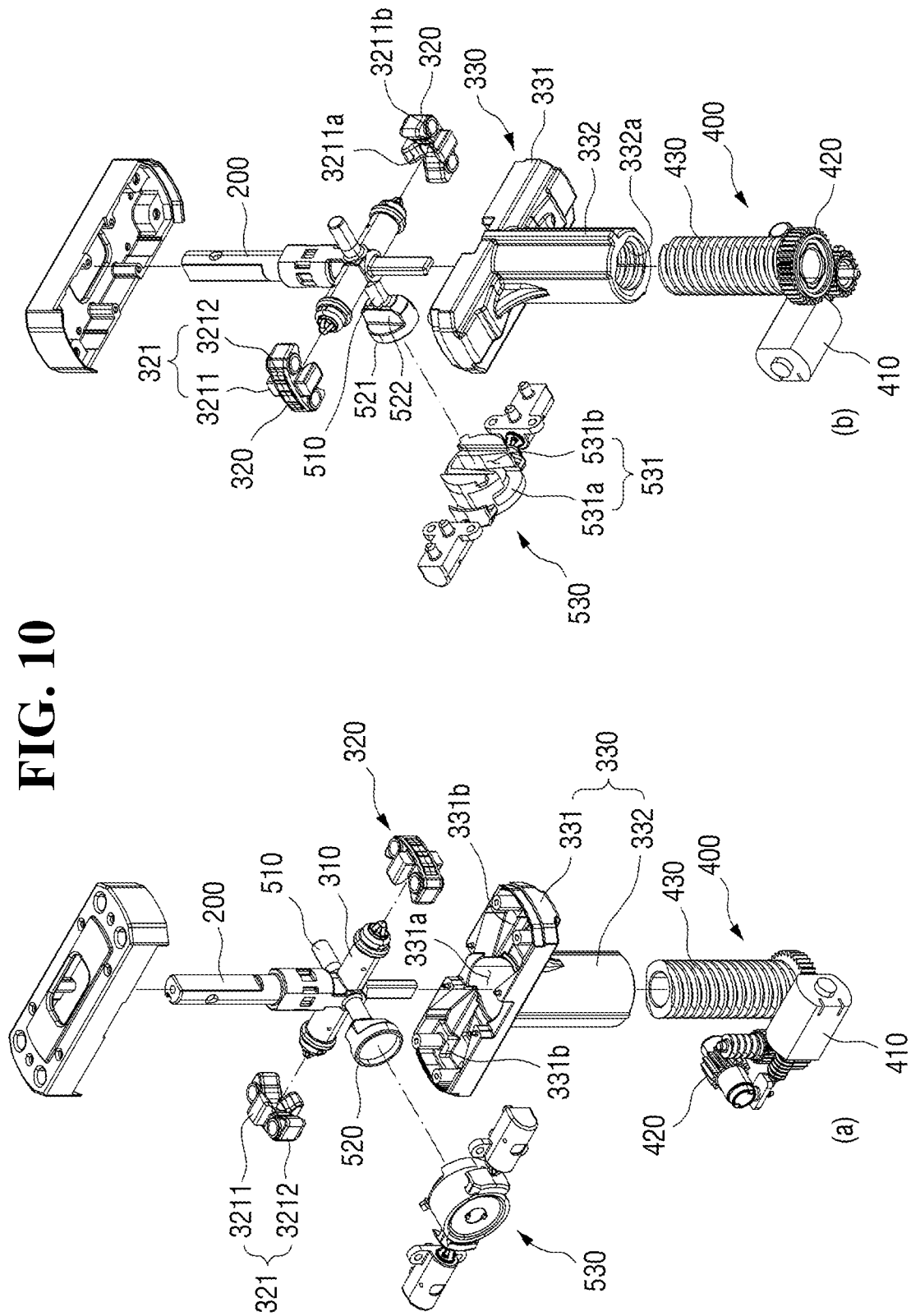
FIG. 10 is an exploded perspective view illustrating some elements of the automotive transmission according to the exemplary embodiment of the present disclosure in one direction and another direction.

FIG. 1 is a perspective view illustrating the exterior of an automotive transmission 1 according to an exemplary embodiment of the present disclosure in a first transmission mode. FIG. 2 is a perspective view illustrating a portion exposed in the first transmission mode of the automotive transmission 1 according to the exemplary embodiment. FIG. 3 is a perspective view illustrating the exterior of the automotive transmission according to the exemplary embodiment in a second transmission mode. FIG. 4 is a perspective view illustrating a portion exposed in the second transmission mode of the automotive transmission 1 according to the exemplary embodiment. FIG. 5 is a perspective view schematically illustrating the interior of the automotive transmission 1 according to the exemplary embodiment in one direction and another direction. FIG. 6 is a perspective view schematically illustrating internal elements of the automotive transmission 1 according to the exemplary embodiment. FIG. 7 is a side view schematically illustrating the internal elements of the automotive transmission 1 according to the exemplary embodiment. FIG. 8 is an exploded perspective view of the automotive transmission 1 according to the exemplary embodiment. FIG. 9 is an exploded perspective view illustrating the automotive transmission 1 according to the exemplary embodiment in another direction. FIG. 10 is an exploded perspective view illustrating some elements of the automotive transmission 1 according to the exemplary embodiment in one direction and another direction.

Referring to FIGS. 1-10, the automotive transmission 1 according to the exemplary embodiment may be configured to change a gear position in at least two different ways based on the needs of a user (e.g., driver) when controlling gear shifting. For example, the automotive transmission 1 according to the exemplary embodiment may be configured to change the gear position in a joystick mode (corresponding to the "first transmission mode" to be described later) and change the gear position in a rotary mode (corresponding to the "second transmission mode" to be described later). The automotive transmission 1 may switch between the joystick mode and the rotary mode.

To change the gear position in at least two different ways as described above, the automotive transmission 1 of the present disclosure may include a knob 100, a lever 200, a lever coupling unit 300, and a driving unit 400. At least some of the elements of the automotive transmission 1 of the present disclosure may be accommodated within a housing 10 and protected from external impact or may be fixed to the housing 10. A cover 700 which may be exposed when the automotive transmission 1 is disposed within a vehicle may be further mounted on an upper surface of the housing 10. The knob 100 and at least a portion of the lever 200 coupled to the knob 100 or only the knob 100 may be exposed through an upper surface of the cover 700 depending on a transmission mode of the automotive transmission 1 which will be described later.

The cover 700 may be provided with a mode change button 710 that is configured to change modes based on the transmission mode of the automotive transmission 1 which will be described later. For example, in FIG. 2, the knob 100 and a portion of the lever 200 may be exposed on the upper surface of the cover 700 to allow the lever 200 to be at a first position to be described later, and the automotive transmission 1 may be in the joystick mode (corresponding to the "first transmission mode" to be described later and hereinafter referred to as the "first transmission mode"). In FIG. 4, the knob 100 may be exposed on the upper surface of the cover 700 to allow the lever 200 to be at a second position to be described later, and the automotive transmission 1 may be in the rotary mode (corresponding to the "second transmission mode" and hereinafter referred to as the "second transmission mode").

Thus, a driver may select one of the first transmission mode and the second transmission mode by pressing the mode change button 710 provided in the cover 700. An operation signal of the mode change button 710 may be transmitted to the driving unit 400 by a controller, and the lever coupling unit 300 may be moved up or down based on the operation of the driving unit 400 to select one of the first transmission mode and the second transmission mode.

Although a case where the cover 700 includes the mode change button 710 is described in the exemplary embodiment, the cover 700 may also be provided with various buttons such as a parking button 720 that corresponds to a park (P) position to control various functions necessary for gear shifting of the vehicle. In addition, although the parking button 720 and the mode change button 710 are formed on a side of the cover 700 in the drawings, the position of these buttons is not limited to thereto.

The knob 100 may be exposed outside the housing 10 and may be coupled to a first end of the lever 200 that serves as a handle. The driver may select a gear position by operating the lever 200 by moving the knob 100. Although a case where gear positions selectable by the operation of the lever 200 include reverse (R), neutral (N), and drive (D) positions is described in the exemplary embodiment, the gear positions selectable by the operation of the lever 200 may be varied. In addition, although a case where the knob 100 serves as a handle is described in the exemplary embodiment, the knob 100 may also be provided with various elements necessary for shifting gears, such as a release button (not illustrated) for releasing a shift lock.

The knob 100 according to the exemplary embodiment may move differently in the first transmission mode and in the second transmission mode to be described later. For example, as will be described later, the first transmission mode may be the joystick mode in which the knob 100 is rotated (e.g., pivoted) about a first rotational axis Ax1 perpendicular to a longitudinal direction of the lever 200 to be described later. In the first transmission mode, the driver may select a gear position by moving the knob 100 forward or backward. On the other hand, the second transmission mode may be the rotary mode in which the knob 100 is rotated about a second rotational axis Ax2 parallel to the longitudinal direction of the lever 200 to be described later.

In the second transmission mode, the driver may select a gear position by rotating the knob 100.

The lever 200 may be coupled to the knob 100 and mounted in a first direction within the housing 10. The lever 200 may be operated in at least one transmission mode to select a gear position. As mentioned earlier, the lever 200 may be operated in the first transmission mode which is the joystick mode and the second transmission mode which is the rotary mode.

In the exemplary embodiment, when an end of the lever 200 which is coupled to the knob 100 and a portion of the lever 200 protrude above the housing 10, specifically, protrude from the cover 700, the lever 200 may be rotated about the first rotational axis Ax1 of a direction (e.g., a second direction) perpendicular to the longitudinal direction (e.g., a first direction) of the lever 200. Accordingly, the lever 200 may be operated in the first transmission mode. In addition, when the entire lever 200 is inserted into the housing 10 and the knob 100 is in close contact with the cover 700, the lever 200 may be rotated about the second rotational axis Ax2 of the longitudinal direction (e.g., the first direction) of the lever 200 at a center of the lever 200. Accordingly, the lever 200 may be operated in the second transmission mode.

As described above, the first transmission mode may be understood as the joystick mode in which the lever 200 is rotated about the first rotational axis Ax1 as the driver moves the knob 100 forward or backward, and the second transmission mode may be understood as the rotary mode in which the lever 200 is rotated about the second rotational axis Ax2 as the driver rotates the knob 100.

The lever coupling unit 300 may be coupled to the lever 200 and may be moved up or down in the first direction by a driving force received from the driving unit 400 to be described later. Accordingly, the lever 200 and the lever coupling unit 300 may be moved together along the first direction. The lever coupling unit 300 may ascend or descend inside the housing 10 and may move between the upper surface of the housing 10 and a fixing bracket 12 provided inside the housing 10. The driving unit 400 to be described later or the like may be mounted in the fixing bracket 12. When the lever coupling unit 300 is disposed at the second position, a moving body 330 of the lever coupling unit 300 may be moved between the upper surface of the housing 10 and the fixing bracket 12. In particular, the moving body 330 of the lever coupling unit 300 may ascend or descend by meshing with the driving unit 400 inside the fixing bracket 12. Elements of the lever coupling unit 300 may be arranged such that the lever coupling unit 300 is operated in the first transmission mode at a first position (see FIG. 2) where the lever 200 protrudes above the cover 700. In addition, the elements of the lever coupling unit 300 may be arranged such that the lever coupling unit 300 is operated in the second transmission mode at a second position (see FIG. 4) where the lever 200 is inserted into the cover 700 and only the knob 100 is in close contact with the cover 700. The configuration of the lever coupling unit 300 will be described in detail with reference to the following drawings.

The driving unit 400 may provide a driving force for moving the lever coupling unit 300 along the first direction. The lever coupling unit 300 may be moved up or down, i.e., in the first direction by the driving force generated from the driving unit 400. When operated in the first transmission mode, the lever 200 may be moved up to the first position. When operated in the second transmission mode, the lever 200 may be moved down to the second position.

The driving unit 400 may include an actuator 410, a lead screw 430, and a transmission gear portion 420. The actuator

410 may generate a driving force for moving the lever coupling unit 300. The transmission gear portion 420 may include one or more gears engaged between the actuator 410 and the lead screw 430. The transmission gear portion 420 may be provided to transmit a driving force generated from the actuator 410 to the lead screw 430. The lead screw 430 may be connected to the transmission gear portion 420 and be rotated about the second rotational axis Ax2 by the driving force generated from the actuator 410. The lead screw 430 may be fixed to a main shaft protruding from the housing 10 while being inserted into an inner hollow of the moving protrusion 332 formed on a surface of the moving body 330. The lead screw 430 may mesh with a threaded portion 332a formed within the hollow of the moving protrusion 332 to move the lever coupling unit 300 up or down based on the rotational direction of the lead screw 430.

In particular, an insertion groove for an end of the lever 200 to be mounted may be formed inside an upper side of the lead screw 430. For example, when the lever 200 is moved from the first position to the second position due to the downward movement of the lever coupling unit 300, a first end position of the lever 200 may be fixedly mounted in the insertion groove. As the second end of the lever 200 is inserted into the insertion groove, the lever 200 may be prevented from rotating about the first rotational axis Ax1, but may be rotated about the second rotational axis Ax2. Therefore, the lever 200 may be operated in the second transmission mode.

Figure 11:
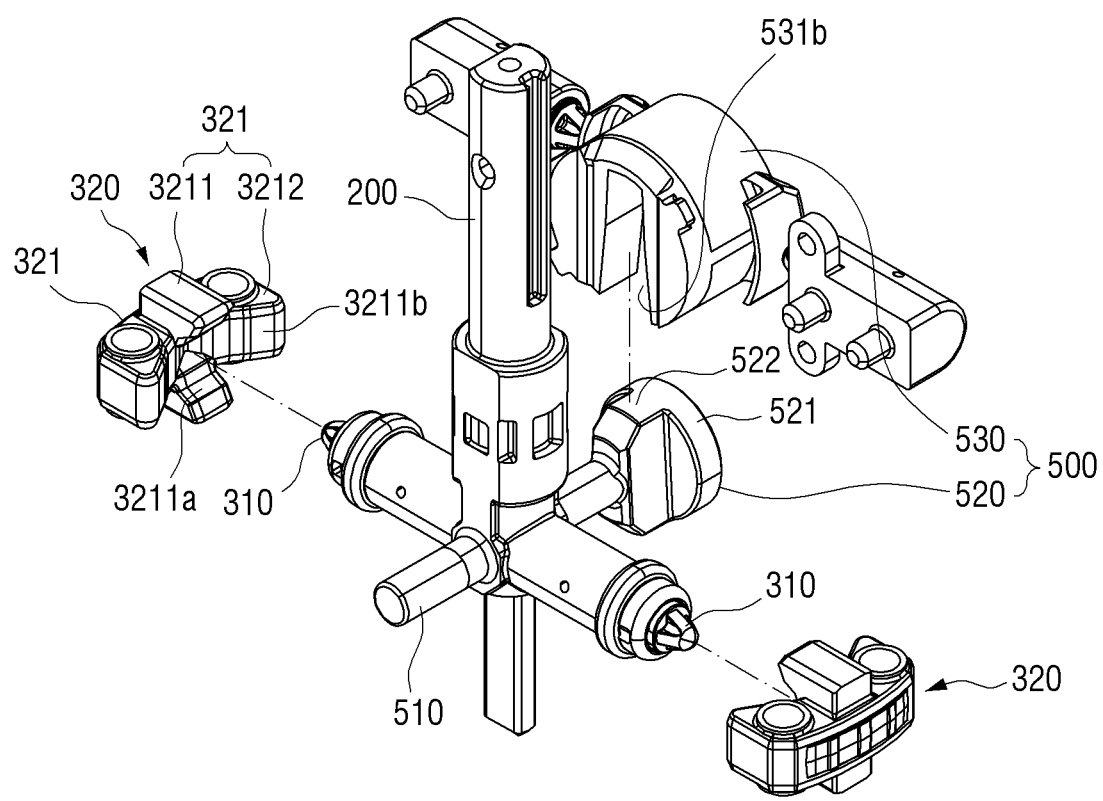
FIG. 11 is an exploded perspective view of a lever coupling unit in the automotive transmission according to the exemplary embodiment of the present disclosure.
Figure 12:
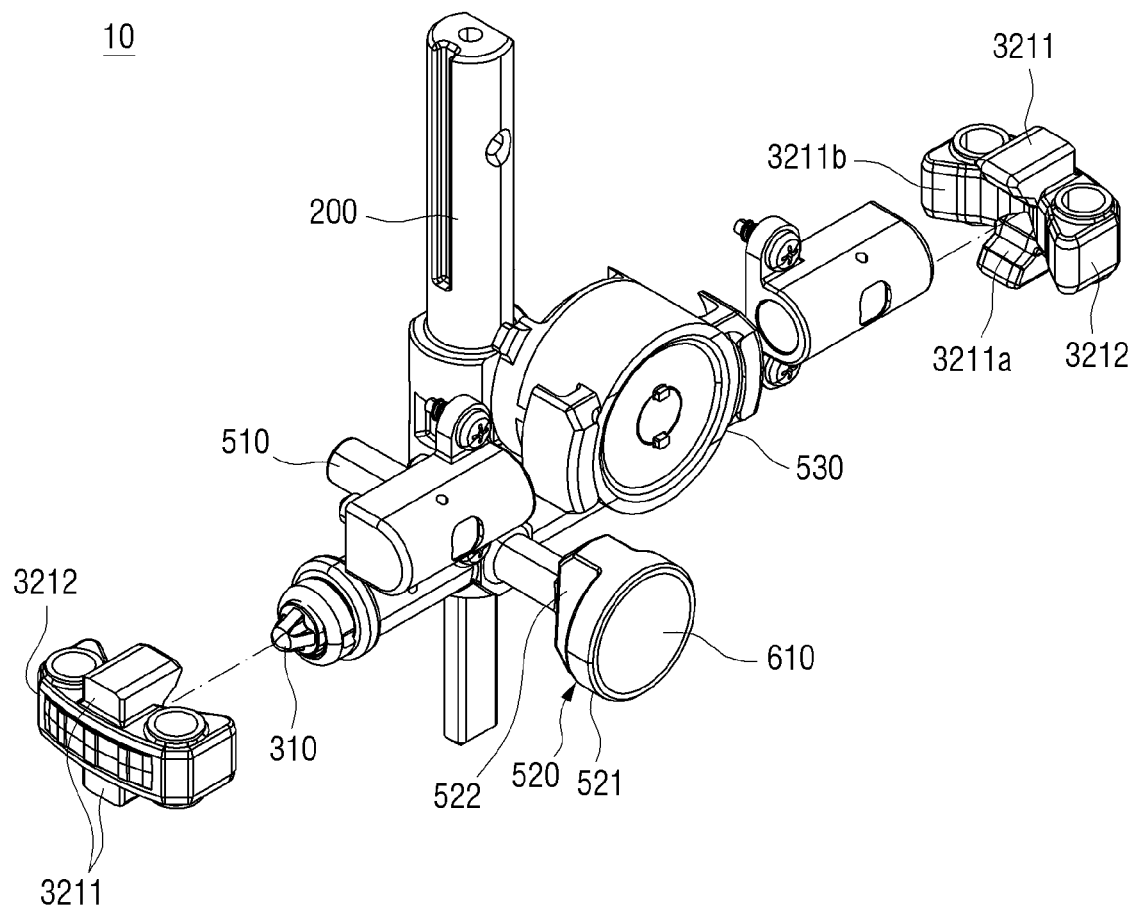
FIG. 12 is an exploded perspective view illustrating the lever coupling unit in another direction in the automotive transmission according to the exemplary embodiment of the present disclosure.
Figure 13:
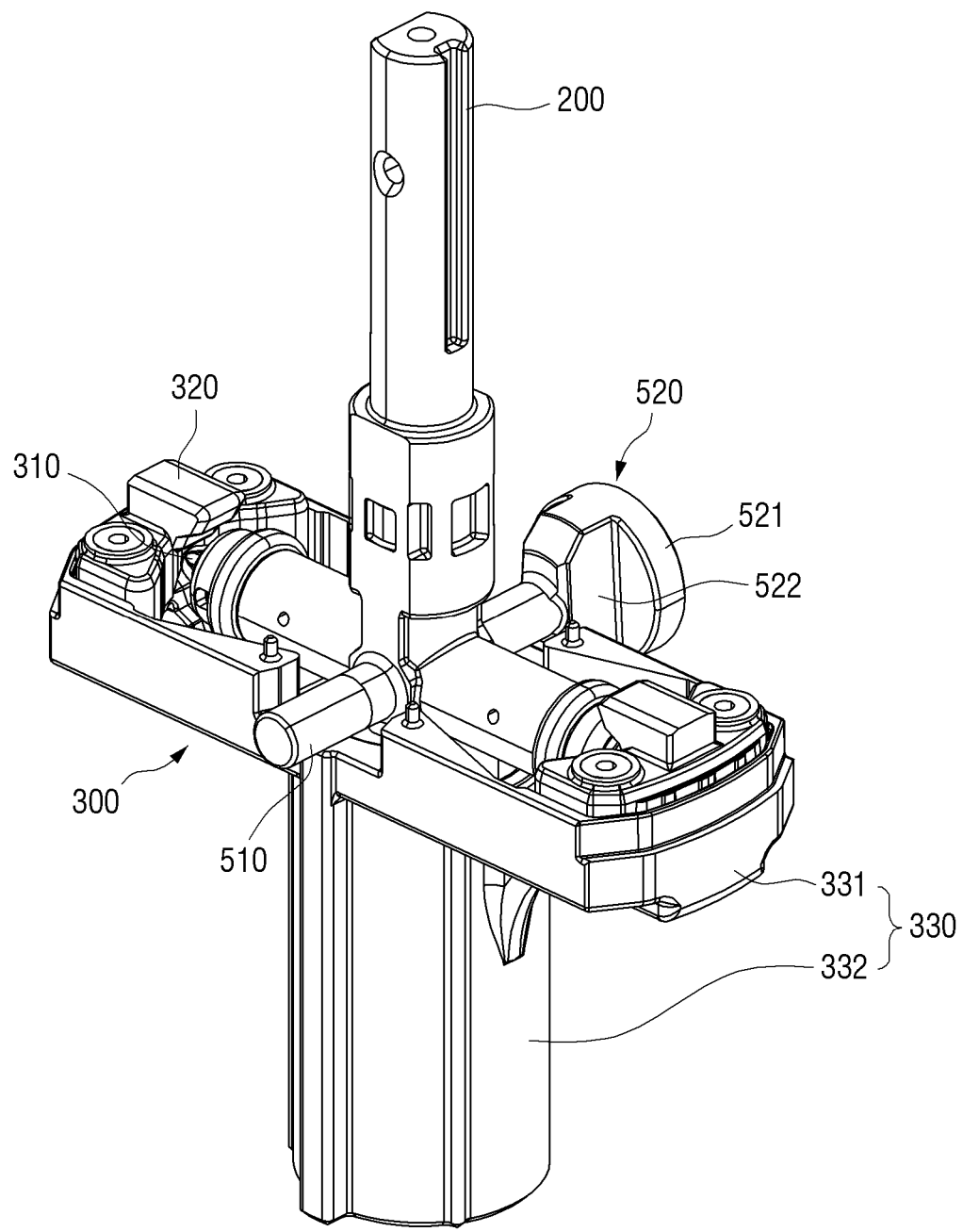
FIG. 13 is a perspective view illustrating the coupled state of a lever and the lever coupling unit in the automotive transmission according to the exemplary embodiment of the present disclosure.
Figure 14:
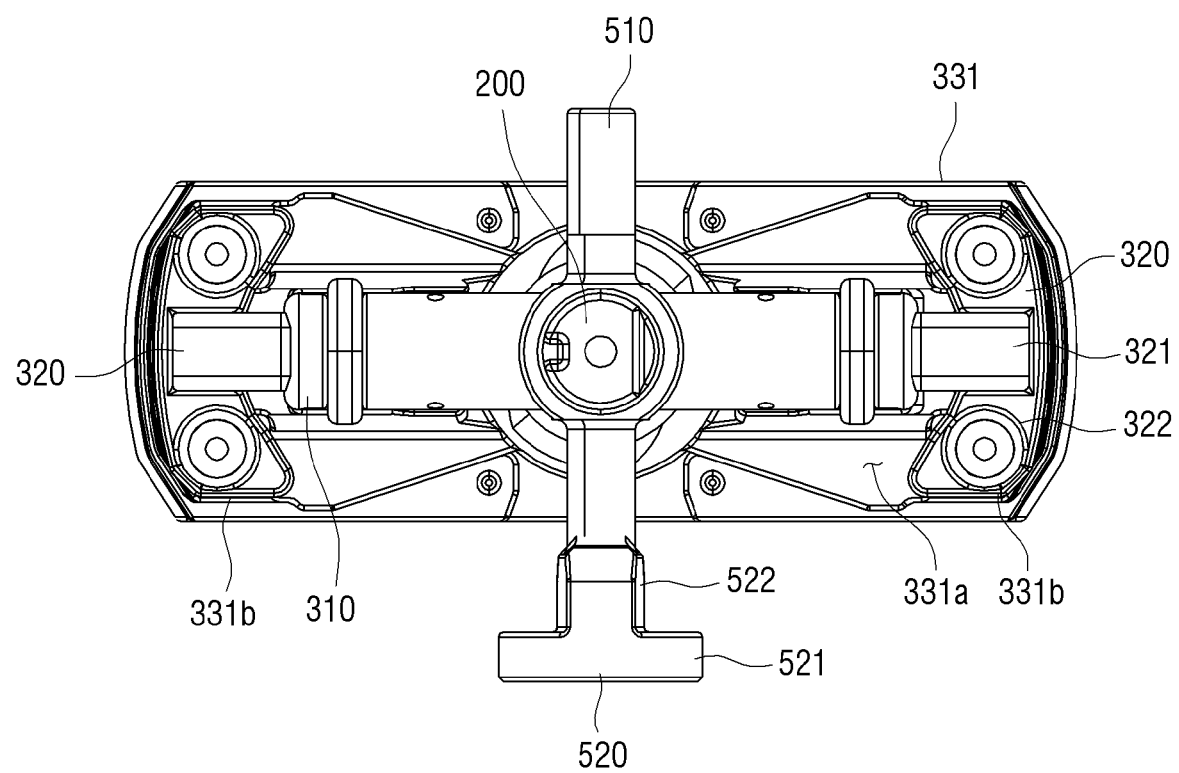
FIG. 14 is a plan view illustrating the coupled state of the lever and the lever coupling unit in the automotive transmission according to the exemplary embodiment of the present disclosure.
Figure 15:
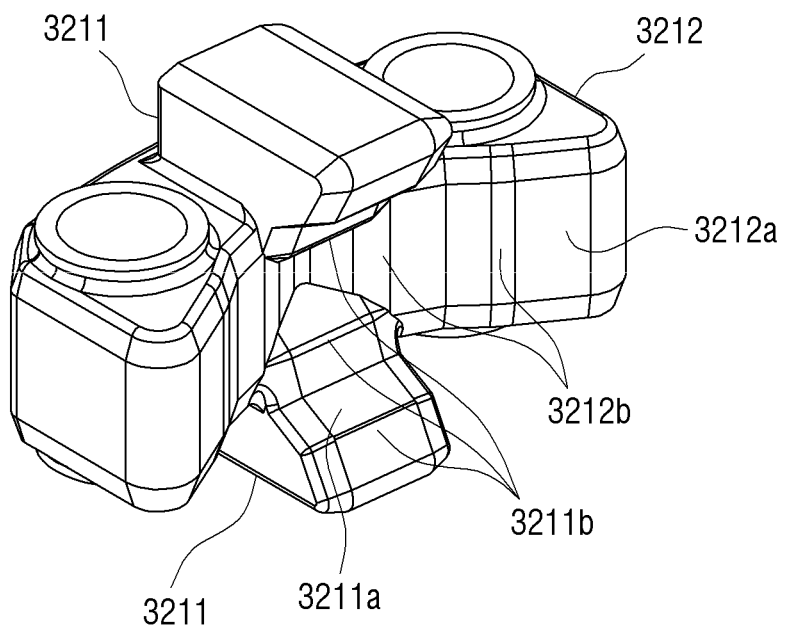
FIG. 15 is a perspective view of a multi-groove portion in the automotive transmission according to the exemplary embodiment of the present disclosure.

The lever coupling unit 300 will be described in detail with reference to FIGS. 11-15. FIG. 11 is an exploded perspective view of the lever coupling unit 300 in the automotive transmission 1 according to the exemplary embodiment. FIG. 12 is an exploded perspective view illustrating the lever coupling unit 300 in another direction in the automotive transmission 1 according to the exemplary embodiment. FIG. 13 is a perspective view illustrating the coupled state of the lever 200 and the lever coupling unit 300 in the automotive transmission 1 according to the exemplary embodiment. FIG. 14 is a plan view illustrating the coupled state of the lever 200 and the lever coupling unit 300 in the automotive transmission 1 according to the exemplary embodiment. FIG. 15 is a perspective view of a multi-groove portion 320 in the automotive transmission 1 according to the exemplary embodiment. Referring to FIGS. 11-15, as described above, the lever coupling unit 300 may be moved up or down along the first direction by a driving force received from the driving unit 400 and may be configured to change a gear position based on a transmission mode at each of the first position and the second position.

In addition, when the lever coupling unit 300 ascends and descends, the lever 200 and the knob 100 coupled to an upper portion of the lever coupling unit 300 may also ascend and descend. Thus, as the lever coupling unit 300 ascends, the lever 200 and the knob 100 coupled to the upper portion of the lever coupling unit 300 may ascend along the first direction. When the lever 200 is disposed at the first direction, the transmission mode may be the first transmission mode as described above. In the exemplary embodiment, the lever 200 may be operated in the joystick mode. In addition, as the lever coupling unit 300 descends, the lever 200 and the knob 100 coupled to the upper portion of the lever coupling unit 300 may also descend along the first direction. When the lever 200 is disposed at the second position, the transmission mode may be the second transmission mode as described above. In the exemplary embodiment, the lever 200 may be operated in the rotary mode. In addition, the lever coupling unit 300 according to the exemplary embodiment may be structured to change the transmission mode between the first transmission mode and the second transmission mode while maintaining its coupled state.

The lever coupling unit 300 according to the exemplary embodiment may include the moving body 330, a bullet portion 310, and the multi-groove portions 320. A side of the moving body 330 may be coupled to the lever 200, and the other side of the moving body 330 may be connected to the driving unit 400. The moving body 330 may be moved up or down along the first direction by the driving force of the driving unit 400. The moving body 330 may form, at a center thereof, a space for accommodating the lever 200, the bullet portion 310 that protrudes from the lever 200 in a third direction, and the multi-groove portions 320. The moving body 330 under the space may be connected to the driving unit 400. For example, the moving body 330 may form a 'T'-shape.

A seating portion 331 may be provided on one surface of the moving body 330, and the moving protrusion 332 may be provided on the other surface of the moving body 330. A surface of the seating portion 331 may form a space for accommodating the bullet portion 310 and the multi-groove portions 320 and rotating the bullet portion 310 about the second direction or about the first direction. The seating portion 331 may include a seating groove 331a and coupling grooves 331b. The seating groove 331a may be formed in the second direction at the center of the moving body 330 to accommodate the bullet portion 310. The seating groove 331a may form a first rotation space in which the bullet portion 310 can be rotated about the second direction of the lever 200 and a second rotation space in which the bullet portion 310 may be rotated about the first direction of the lever 200. The coupling grooves 331b may be formed at both ends of the seating groove 331a and at both ends of the moving body 330, and the multi-groove portions 320 may be fixedly mounted in the coupling grooves 331b.

The moving protrusion 332 may protrude from a lower surface of the seating portion 331. A hollow may be formed in the moving protrusion 332, and the threaded portion 332a configured to be meshed with the lead screw 430 of the driving unit 400 described above may be formed on an inner surface of the hollow. When the moving protrusion 332 is engaged with the lead screw 430, the lead screw 430 may be rotated clockwise or counterclockwise due to the driving of the actuator 410, and the moving protrusion 332 may be moved up or down along the first direction based on the rotation direction of the lead screw 430. Accordingly, the moving body 330 may be moved along the first direction, and elements mounted on the moving body 330, specifically, the bullet portion 310 and the multi-groove portions 320 may be moved together with the moving body 330.

The bullet portion 310 may be provided in the lever 200 or may protrude from the lever 200 in the third direction perpendicular to the first direction and the second direction. In an exemplary embodiment, the bullet portion 310 may protrude in the third direction from the lever 200 and protrude from both side surfaces of the lever 200. The multi-groove portions 320 may be disposed at both ends of the bullet portion 310, respectively, and both ends of the bullet portion 310 may be mounted to elastically contact inner surfaces (contact surfaces 3211a and 3212a) of the multi-groove portions 320. The bullet portion 310 may be swingably and elastically supported by an elastic body such as a spring. When the bullet portion 310 is rotated about the first rotational axis Ax1 or the second rotational axis Ax2, the bullet portion 310 may be moved along the contact surfaces 3211a and 3212a of the multi-groove portions 320, thereby generating a feeling of operation (e.g., operation feedback, tactile feedback, or a haptic feedback).

The multi-groove portions 320 may be respectively provided at both ends of the seating portion 331 as long as the multi-groove portions 320 may be fixedly mounted in the coupling grooves 331b to mesh with both ends of the bullet portion 310. The multi-groove portions 320 may form a plurality of first shift portions in the first direction and form a plurality of second shift portions in the second direction. Each of the multi-groove portions 320 may form a '+'-shaped body 321, portions of which intersect in the first direction and the second direction.

The body 321 may include a first shift body 3211 which is extended upward and downward along the first direction from a central portion and may include a first shift portion on an inside thereof. In addition, the body 321 may include a second shift body 3212 which is formed integrally with the first shift body 3211, and the second shift body may extend to the right and left along the second direction and may include a second shift portion on an inside thereof.

The first shift portion formed on an inner surface of the first shift body 3211 may be formed in a 'V' shape having a predetermined curvature in the first direction on the inside of the first shift body 3211. The 'V'-shaped first shift portion may form a first shift contact surface 3211a which forms a plurality of stepped surfaces in the second direction on the inside of the first shift body 3211. An end of the bullet portion 310 may contact the first shift contact surface 3211a, and the bullet portion 310 may be moved along the first shift contact surface 3211a from one end of the first shift contact surface 3211a to the other end while elastically contacting the first shift contact surface 3211a.

The second shift portion formed on an inner surface of the second shift body 3212 may be formed in a 'V' shape having a predetermined curvature in the second direction on the inside of the second shift body 3212. The 'V'-shaped second shift portion may form a second shift contact surface 3212a which forms a plurality of stepped surfaces in the first direction on the inside of the second shift body 3212. An end of the bullet portion 310 may contact the second shift contact surface 3212a, and the bullet portion 310 may be moved along the second shift contact surface 3212a from one end of the second shift contact surface 3212a to the other end while elastically contacting the second shift contact surface 3212a.

Based on the shape of the multi-groove portions 320, a center of each of the multi-groove portions 320 may include a home position HP (e.g., base position). The bullet portion 310 may return to the home position HP after changing the gear position. In each of the multi-groove portions 320, a stepped portion formed above the home position HP may be configured to change the gear position to the N position and the R position, and a stepped portion formed below the home position HP may be configured to change the gear position to the D position. In addition, a stepped portion formed to the left of the home position HP may be configured to change the gear position to the N position and the R position, and a stepped portion formed to the right of the home portion HP may be configured to change the gear position to the D position.

A rotation restricting member 500 may be provided to restrict the elevation of the lever coupling unit 300 while facing the moving body 330 and to restrict the rotation of the lever coupling unit 300 about the first direction, i.e., about the second rotational axis Ax2 when the lever coupling unit 300 is disposed at the first position inside the housing 10.

The rotation restricting member 500 may be coupled to or decoupled from the lever coupling unit 300 depending on the position of the lever coupling unit 300. For example, the rotation restricting member 500 may be coupled to the lever coupling unit 300 when the lever coupling unit 300 is moved up to the first position along the first direction and may be decoupled from the lever coupling unit 300 at the second position. In addition, when the lever coupling unit 300 is coupled to the rotation restricting member 500, the rotation of the lever coupling unit 300 about the second rotational axis Ax2 may be restricted. When the lever coupling unit 300 is decoupled from the rotation restricting member 500, the rotation of the lever coupling unit 300 about the second rotational axis Ax2 may be allowed.

The rotation restricting member 500 may include a rod portion 510 and a roller portion 530. The rod portion 510 may protrude in the second direction at a point where the lever 200 and the bullet portion 310 intersect, and a coupling member 520 may be provided at an end of the rod portion 510. The coupling member 520 may include a circular head 521 and a seating protrusion 522 which protrudes from the circular head 521. The seating protrusion 522 may protrude from the circular head 521 along a diameter of the circular head 521 in the first direction and may provide a surface-contact to at least a portion of an inner surface of a coupling groove 531b.

The roller portion 530 may be mounted in the housing 10 and may be rotatable about the second direction by a predetermined angle. The coupling groove 531b in which the coupling member 520 is seated may be formed in a surface of the roller portion 530. The coupling groove 531b may form a first groove into which the circular head 521 is inserted and a second groove into which the seating protrusion 522 is inserted. Since the roller portion 530 is rotatable about the second direction by the predetermined angle, when the rod portion 510, specifically, the coupling member 520 is mounted in the roller portion 530, the rotation of roller portion 530 about the first direction may be restricted while the rotation of the roller portion 530 about the rod portion 510 and the second direction may be allowed.

The automotive transmission 1 according to the exemplary embodiment may further include a sensing unit 600 to sense a change in the lever 200 according to the first transmission mode or the second transmission mode. In other words, the sensing unit 600 may sense the position of the lever 200 and a change in the rotation of the lever 200 according to the first transmission mode at the first position and may sense the position of the lever 200 and a change in the rotation of the lever 200 according to the second transmission mode at the second position. The sensing unit 600 may include a magnet 610, a first sensor 620, and a second sensor 630. The magnet 610 may be coupled to a mounting groove formed in a surface of the circular head 521. The first sensor 620 may be provided in the roller portion 530. In the first transmission mode, the first sensor 620 may be disposed adjacent to the magnet 610 to sense a change in a magnetic force of the magnet 610. The second sensor 630 may be provided to face the magnet 610 at the second position. At the second position, the second sensor 630 may be disposed adjacent to the magnet 610 and sense a change in the magnetic force of the magnet 610.

As mentioned earlier, the automotive transmission 1 according to the exemplary embodiment may be operated in at least two transmission modes, specifically, in the first transmission mode and the second transmission mode. In particular, the automotive transmission 1 according to the exemplary embodiment may be configured to easily switch between the first transmission mode and the second transmission mode based on a change in the position of the lever coupling unit 300. The position, coupled state, operation, and the like of the elements of the automotive transmission 1 when the automotive transmission 1 is in the first transmission mode will now be described with reference to FIGS. 16-20.

Figure 16:
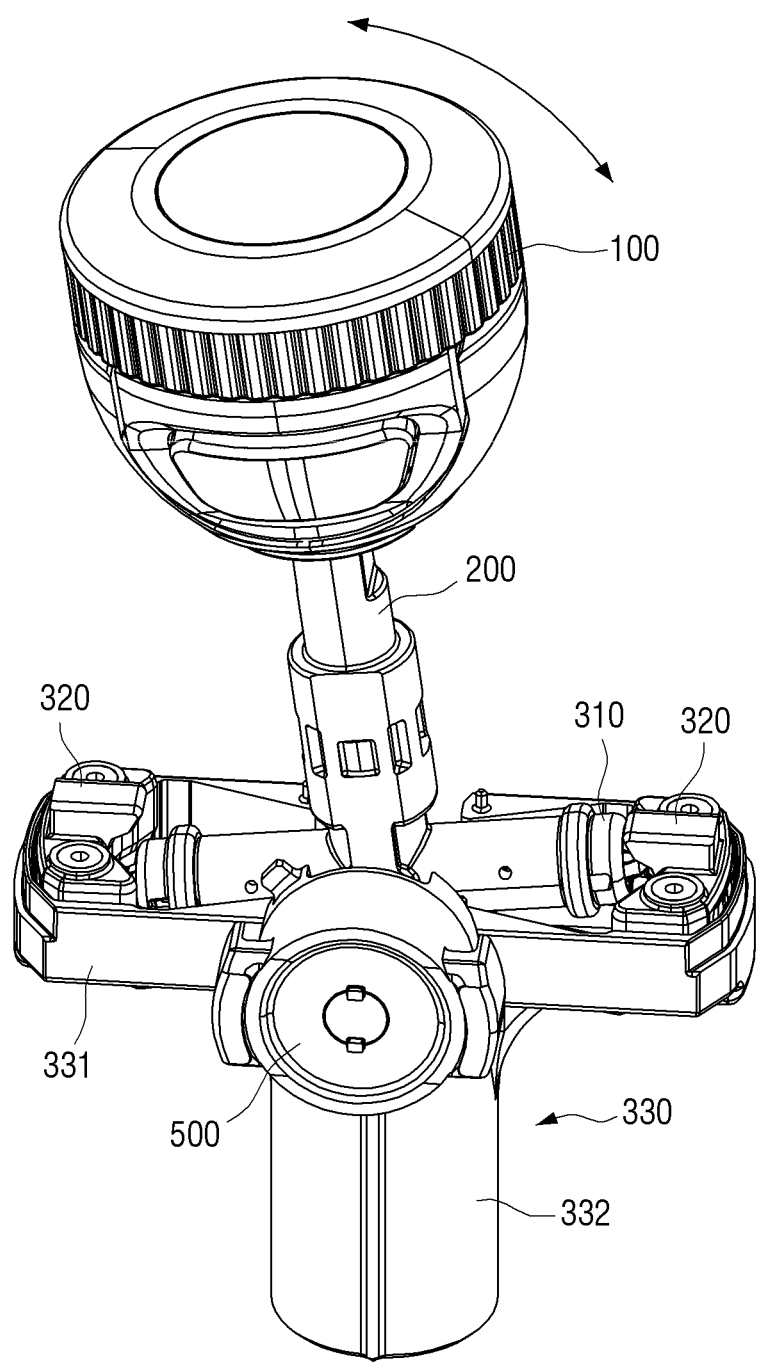
FIG. 16 schematically illustrates the coupled driving state of the lever coupling unit in the first transmission mode in the automotive transmission according to the exemplary embodiment of the present disclosure.
Figure 17:
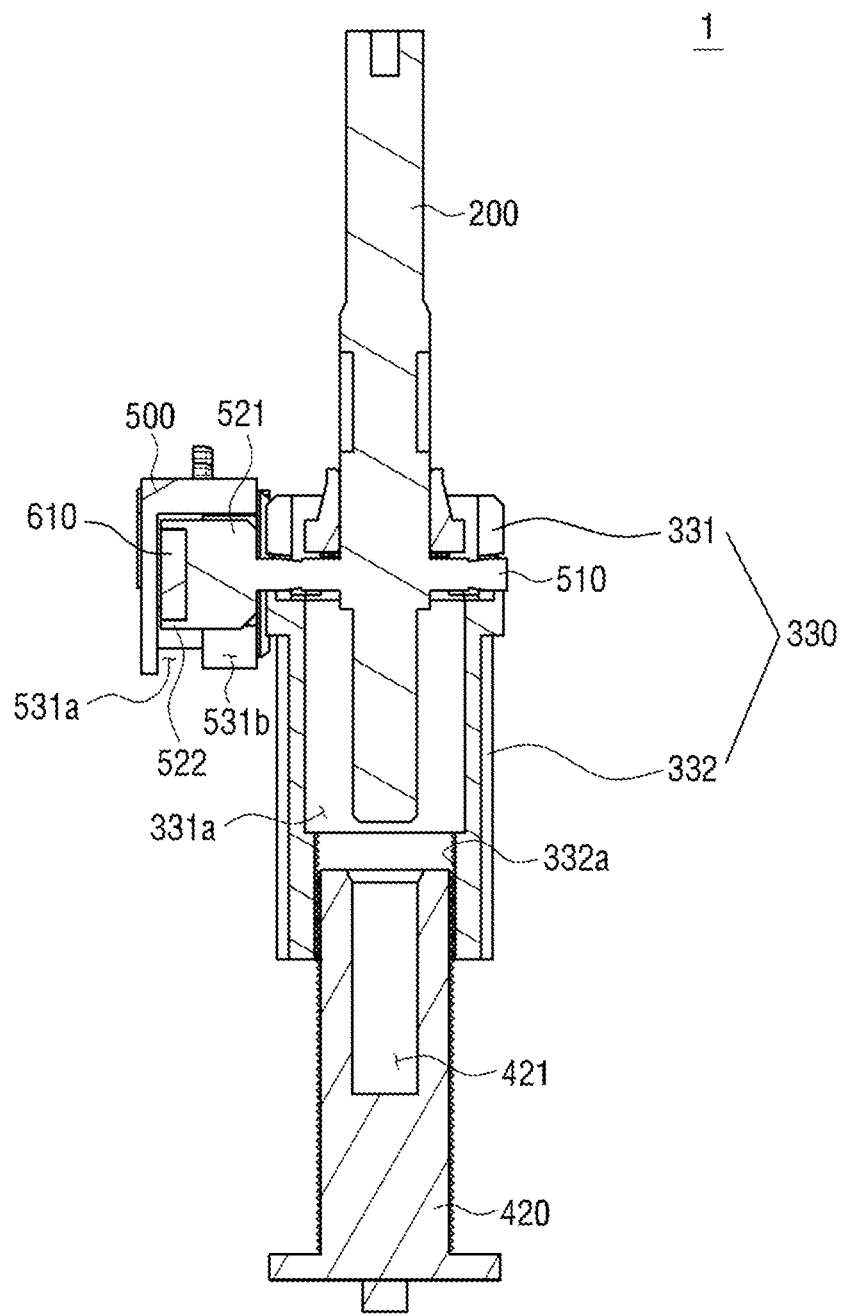
FIG. 17 is a cross-sectional view illustrating the coupled state of the lever coupling unit in the first transmission mode in the automotive transmission according to the exemplary embodiment of the present disclosure.
Figure 18:
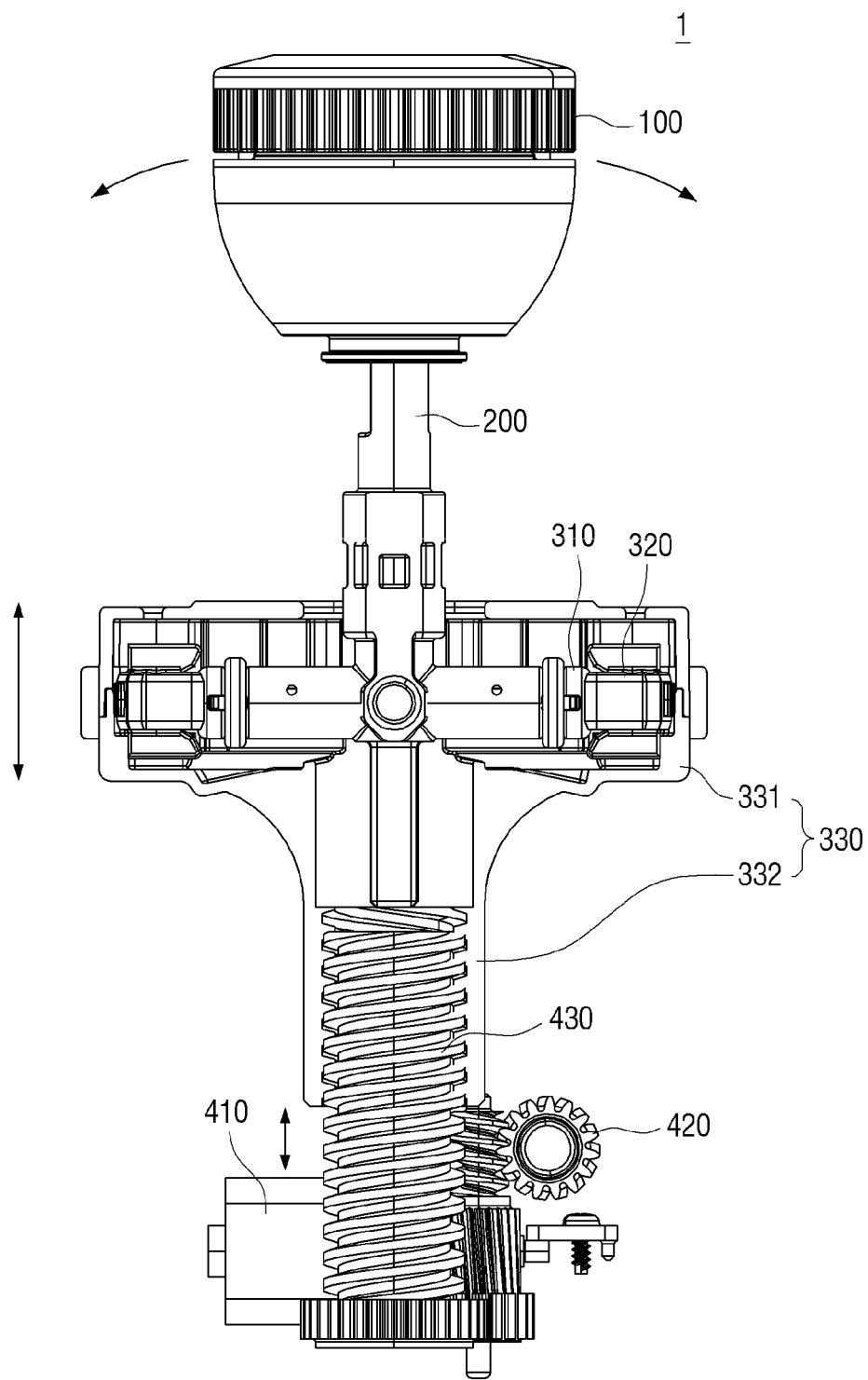
FIG. 18 is a side view illustrating the driving state of the automotive transmission according to the exemplary embodiment of the present disclosure in the first transmission mode.
Figure 19:
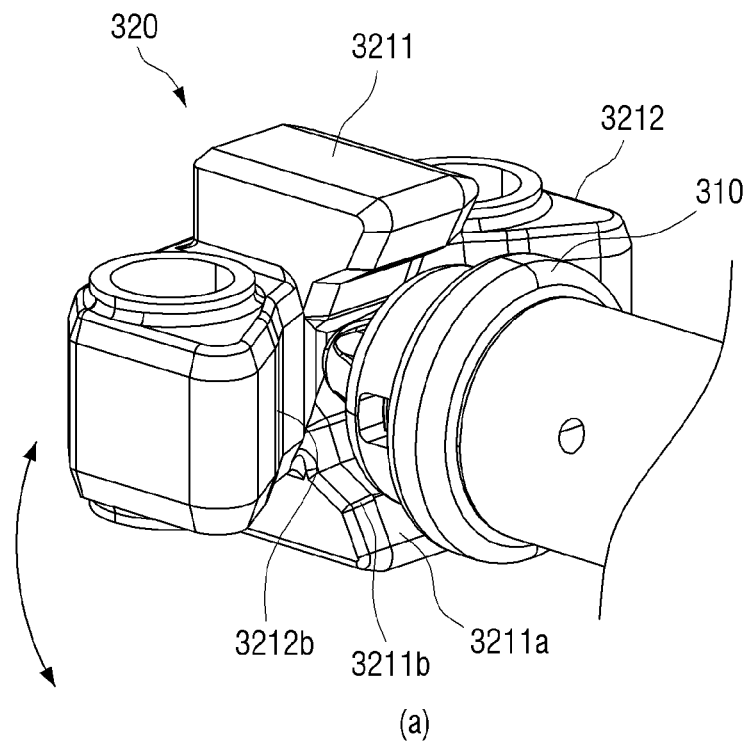
FIG. 19 illustrates the coupled state of a multi-groove portion and a bullet portion in the first transmission mode in the automotive transmission according to the exemplary embodiment of the present disclosure.
Figure 19:
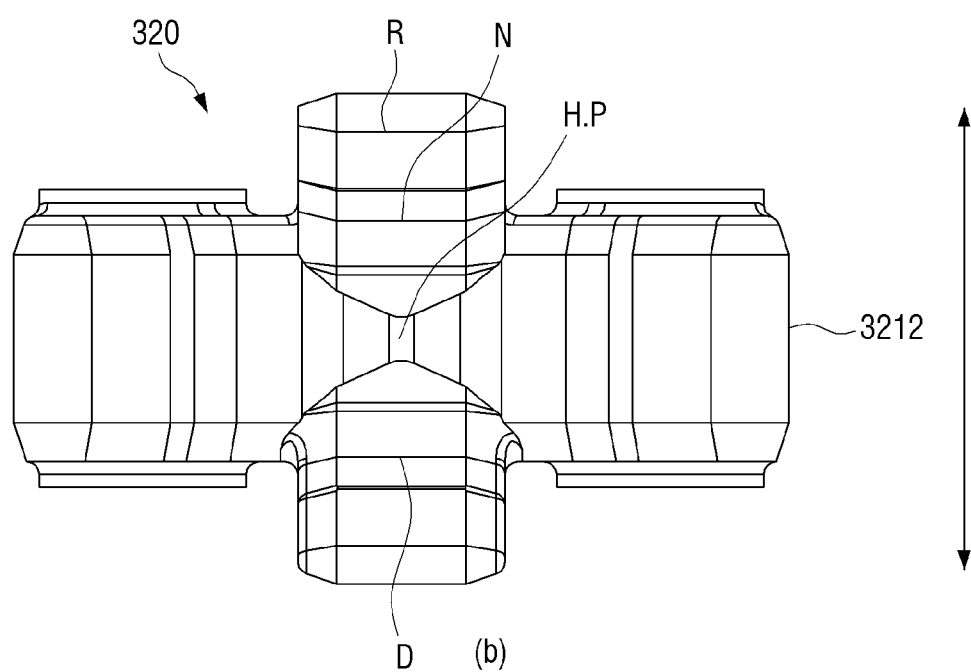
Figure 20:
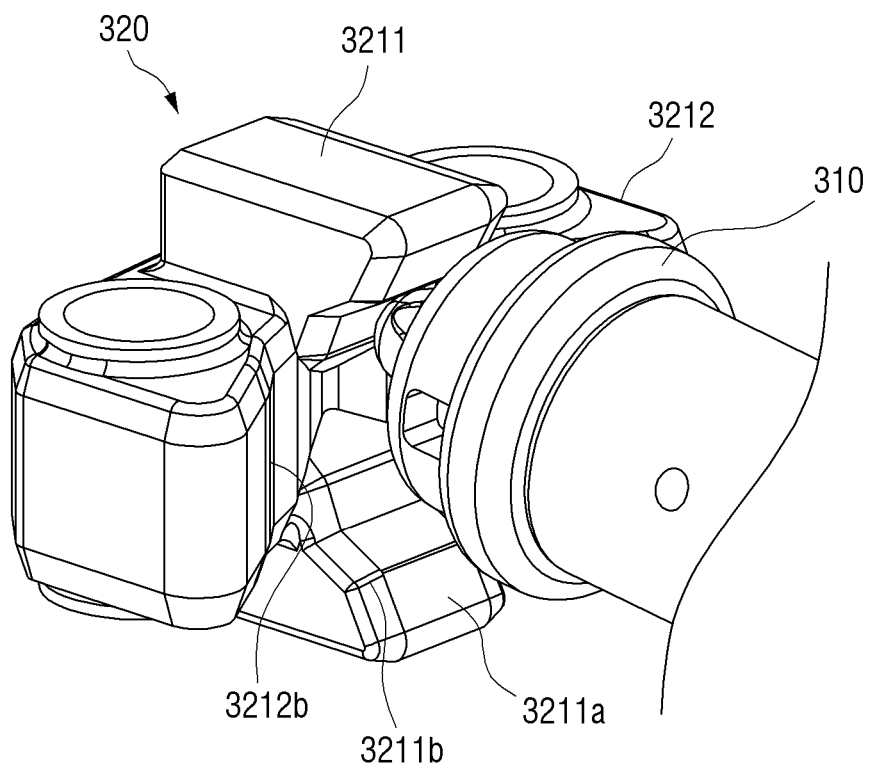
FIG. 20 is a partial perspective view illustrating the driving state of the multi-groove portion and the bullet portion in the first transmission mode in the automotive transmission according to the exemplary embodiment of the present disclosure.

FIG. 16 schematically illustrates the coupled driving state of the lever coupling unit 300 in the first transmission mode in the automotive transmission 1 according to the exemplary embodiment. FIG. 17 is a cross-sectional view illustrating the coupled state of the lever coupling unit 300 in the first transmission mode in the automotive transmission 1 according to the exemplary embodiment. FIG. 18 is a side view illustrating the driving state of the automotive transmission 1 according to the exemplary embodiment in the first transmission mode. FIG. 19 is a partial perspective view illustrating the coupled state of a multi-groove portion 320 and the bullet portion 310 in the first transmission mode in the automotive transmission 1 according to the exemplary embodiment. FIG. 20 illustrates the driving state of the multi-groove portion 320 and the bullet portion 310 in the first transmission mode in the automotive transmission 1 according to the exemplary embodiment.

Referring to FIGS. 16-20, as mentioned earlier, the automotive transmission 1 according to the exemplary embodiment may select a transmission mode using the mode change button 710 provided in the cover 700. For example, when the first transmission mode is selected using the mode change button 710, the knob 100, the lever 200, and the lever coupling unit 300 may be moved up to the first position along the first direction due to the driving of the driving unit 400.

Specifically, when the actuator 410 is driven, a driving force of the actuator 410 may be transmitted to the lead screw 430 via the transmission gear portion 420, thereby rotating the lead screw 430. Since the lead screw 430 is engaged with the threaded portion 332a of the moving protrusion 332, the moving protrusion 332 may be moved up due to the rotation of the lead screw 430. As the moving protrusion 332 ascends in the first direction, the moving body 330 as well as the bullet portion 310 and the multi-groove portions 320 mounted on the moving body 330 may also ascend.

When the moving body 330 ascends, the rod portion 510 that protrudes in the second direction from the lever coupling unit 330 may also ascend, and the coupling member 520 formed at an end of the rod portion 510 may be inserted into the coupling groove 531b of the roller portion 530 disposed at the first position. When the rod portion 510 is inserted into the roller portion 530, the bullet portion 310 may be rotated about the second direction, but the rotation of the bullet portion 310 about the first direction may be restricted. In other words, the bullet portion 310 may be rotated about the first rotational axis Ax1, but its rotation about the second rotational axis Ax2 may be restricted.

When the bullet portion 310 is rotated about the first rotational axis Ax1, the knob 100 and the lever 200 may also be rotated about the first rotational axis Ax1 but may be prevented from rotating about the second rotational axis Ax2. In other words, the knob 100 may be moved in a front-back direction of the vehicle to change the gear position. When the bullet portion 310 is rotated about the first rotational axis Ax1, the bullet portion 310 may be moved up or down in a vertical direction in the first rotation space of the moving body 330, and each end of the bullet portion 310 may be moved up or down along the first shift contact surface 3211a of the first shift body 3211 of a corresponding multi-groove portion 320 while contacting the first shift contact surface 3211a. Since a plurality of stepped surfaces are formed along the second direction in the first shift contact surface 3211a, when the bullet portion 310 moves across the stepped surfaces, a change in force may occur due to the elastic force of the bullet portion 310 in each shift section, thereby generating a feeling of operation. For example, the gear position may be changed to the N position and the R position as the bullet portion 310 is moved upward from the home position HP of the multi-groove portion 320 along the stepped surfaces formed in the second direction. On the contrary, the gear position may be changed to the D position as the bullet portion 310 is moved downward from the home position HP of the multi-groove portion 320 along the stepped surfaces formed in the second direction.

In addition, the coupling member 520 of the rod portion 510 may be coupled to the coupling groove 531b of the roller portion 530, and the roller portion 530 may be rotated about the rod portion 510. When the rod portion 510 is disposed in the roller portion 530, the magnet 610 formed on the surface of the circular head 521 and the first sensor 620 disposed in the roller portion 530 may be disposed adjacent to each other. When a gear position is selected, the position of the magnet 610 may be changed due to the rotation of the roller portion 530. Accordingly, the first sensor 620 may sense a change in the magnetic force of the magnet 610, and the sensed value from the first sensor 620 may be transmitted to the controller (not illustrated) to cause a control signal to be transmitted to a transmission to change the gear position to the selected gear position.

The position, coupled state, operation, and the like of the elements of the automotive transmission 1 when the automotive transmission 1 is in the second transmission mode will now be described with reference to FIGS. 21-27.

Figure 21:
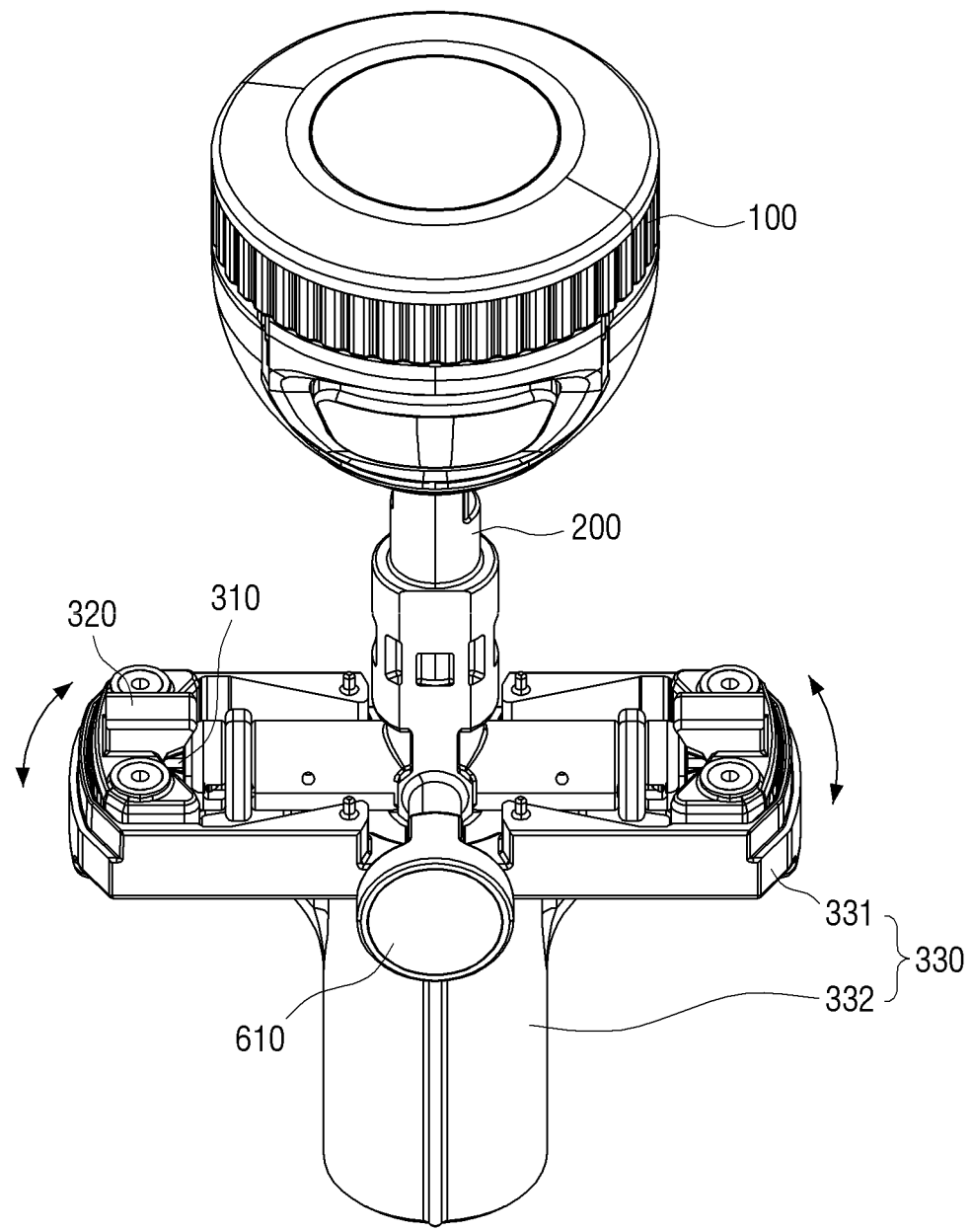
FIG. 21 schematically illustrates the coupled driving state of the lever coupling unit in the second transmission mode in the automotive transmission according to the exemplary embodiment of the present disclosure.
Figure 22:
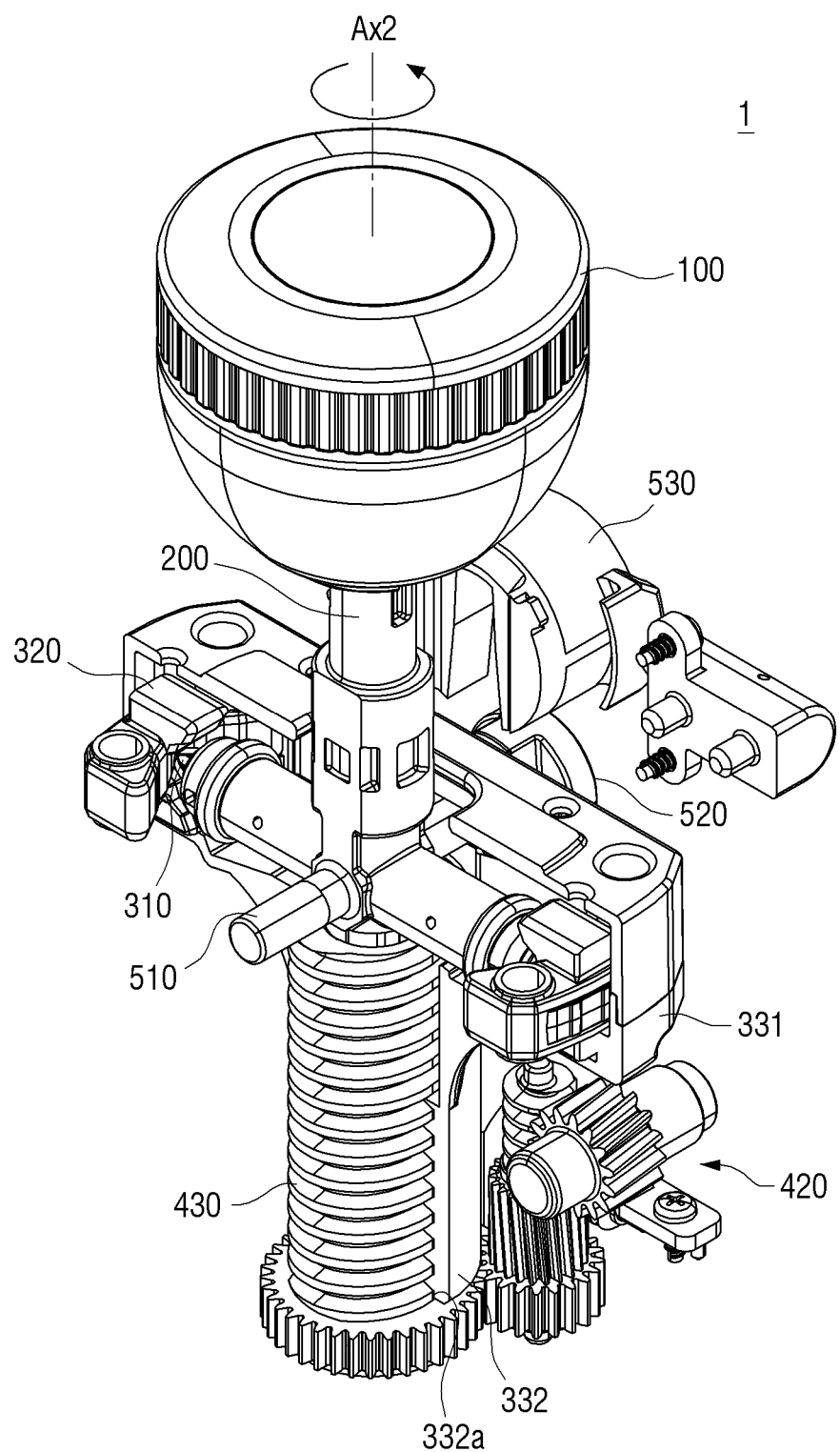
FIG. 22 is a perspective view schematically illustrating the driving state of the automotive transmission according to the exemplary embodiment of the present disclosure in the second transmission mode.
Figure 23:
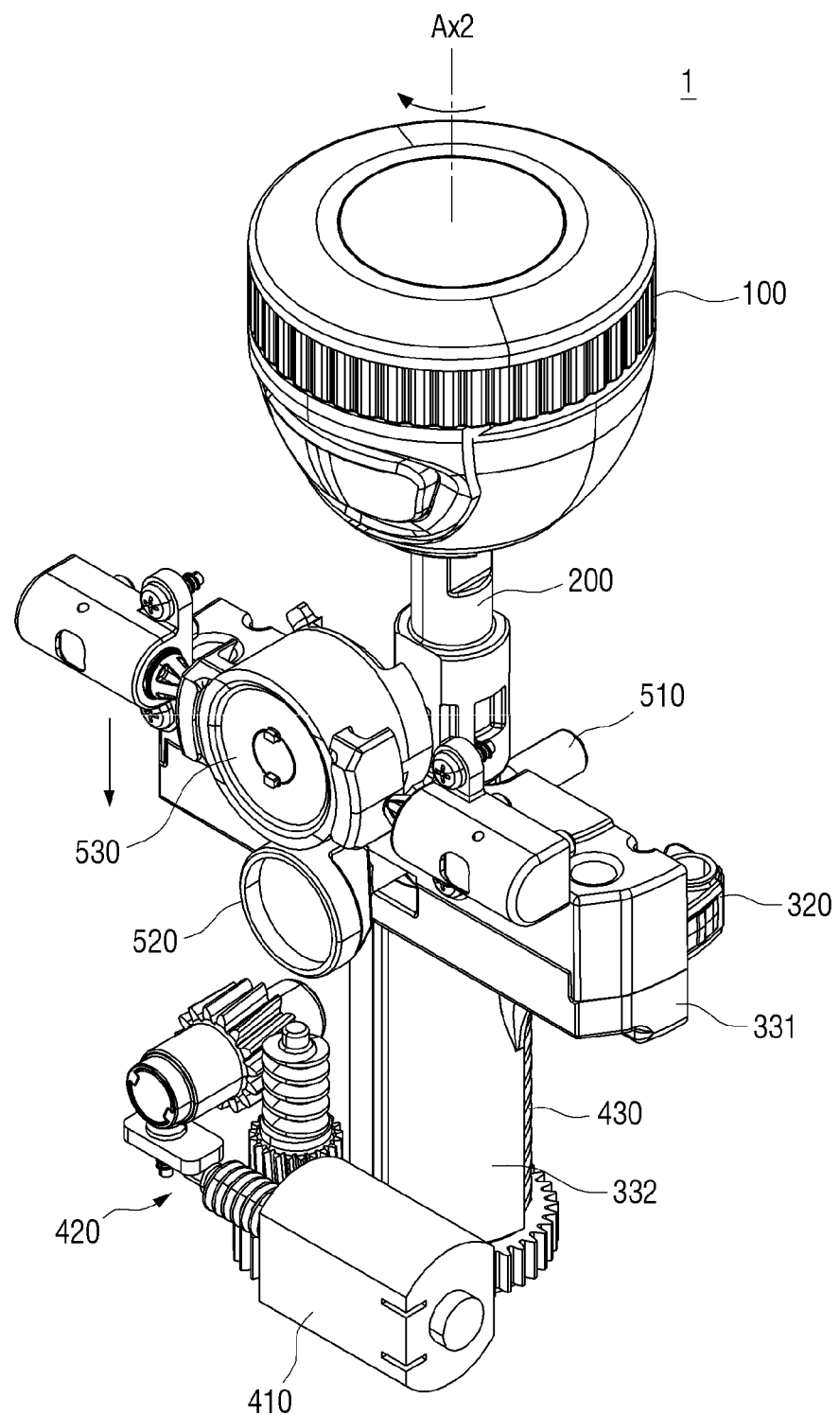
FIG. 23 is a perspective view schematically illustrating, in another direction, the driving state of the automotive transmission according to the exemplary embodiment of the present disclosure in the second transmission mode.
Figure 24:
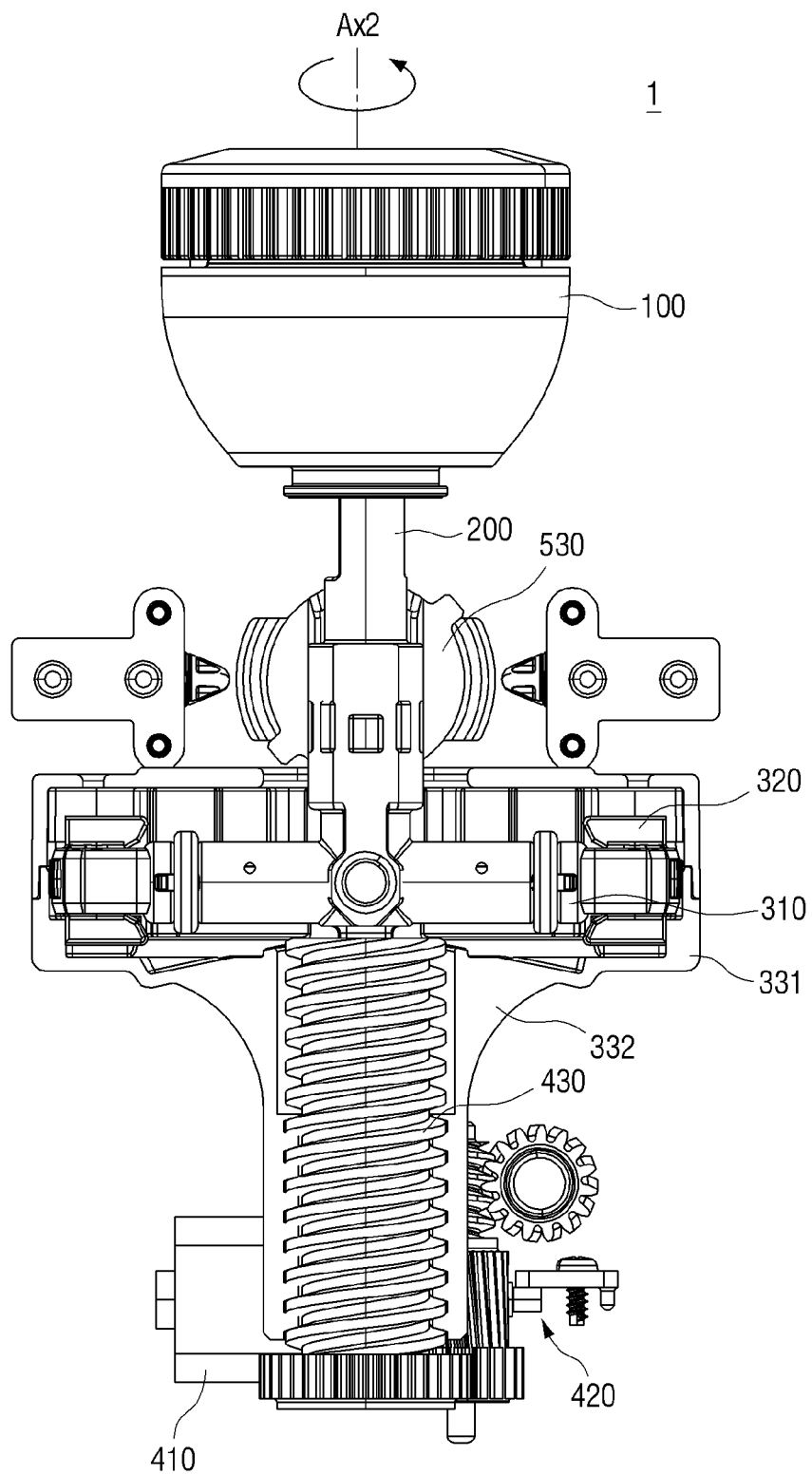
FIG. 24 is a side view schematically illustrating the driving state of the automotive transmission according to the exemplary embodiment of the present disclosure in the second transmission mode.
Figure 25:
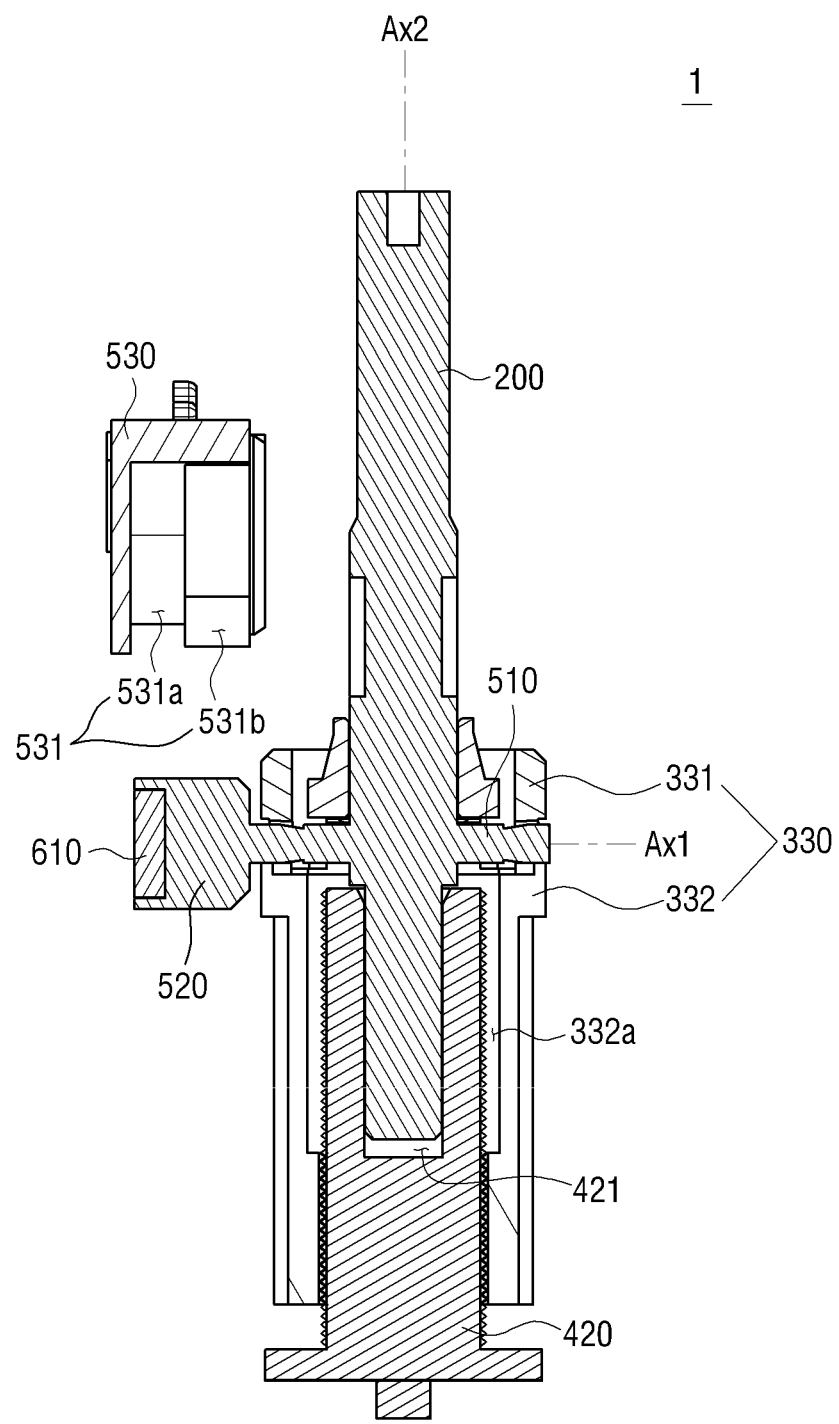
FIG. 25 is a cross-sectional view schematically illustrating the driving state of the automotive transmission according to the exemplary embodiment of the present disclosure in the second transmission mode.
Figure 26:
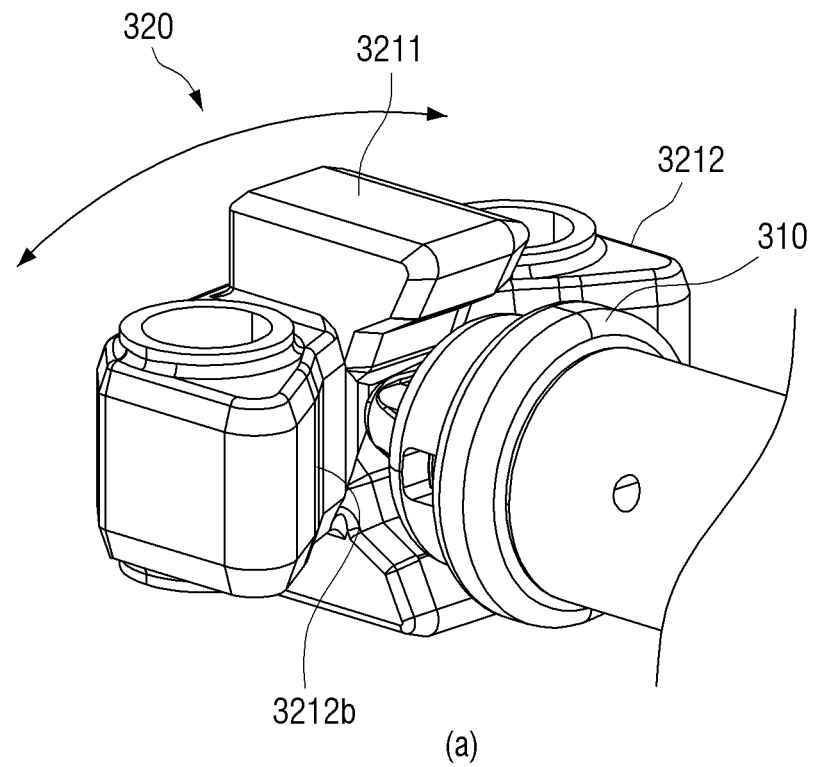
FIG. 26 illustrates the coupled state of a multi-groove portion and the bullet portion in the second transmission mode in the automotive transmission according to the exemplary embodiment of the present disclosure.
Figure 26:
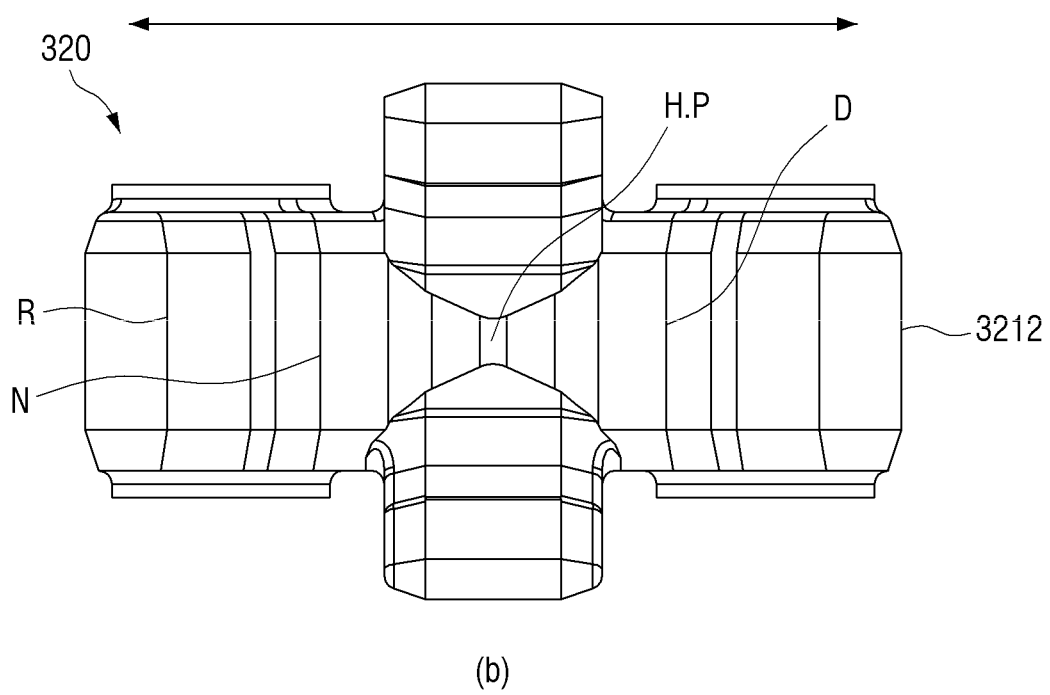
Figure 27:
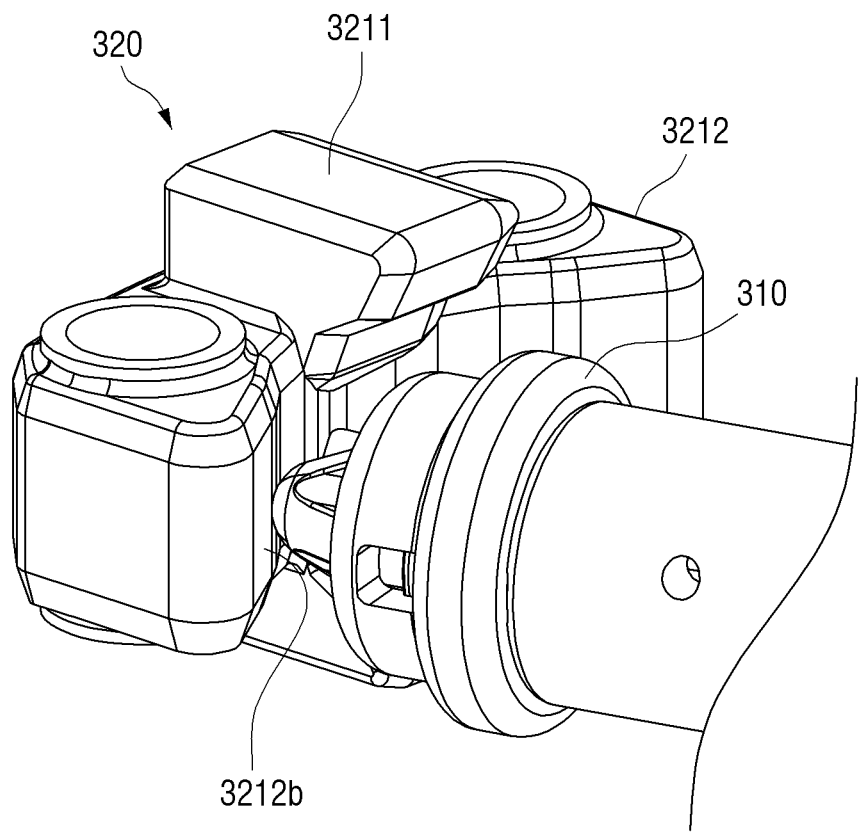
FIG. 27 illustrates the driving state of the multi-groove portion and the bullet portion in the second transmission mode in the automotive transmission according to the exemplary embodiment of the present disclosure.

FIG. 21 schematically illustrates the coupled driving state of the lever coupling unit 300 in the second transmission mode in the automotive transmission 1 according to the exemplary embodiment. FIG. 22 is a perspective view schematically illustrating the driving state of the automotive transmission 1 according to the exemplary embodiment in the second transmission mode. FIG. 23 is a perspective view schematically illustrating, in another direction, the driving state of the automotive transmission 1 according to the exemplary embodiment in the second transmission mode. FIG. 24 is a side view schematically illustrating the driving state of the automotive transmission 1 according to the exemplary embodiment in the second transmission mode. FIG. 25 is a cross-sectional view schematically illustrating the driving state of the automotive transmission 1 according to the exemplary embodiment in the second transmission mode. FIG. 26 is a partial perspective view illustrating the coupled state of a multi-groove portion 320 and the bullet portion 310 in the second transmission mode in the automotive transmission 1 according to the exemplary embodiment. FIG. 27 illustrates the driving state of the multi-groove portion 320 and the bullet portion 310 in the second transmission mode in the automotive transmission 1 according to the exemplary embodiment.

Referring to FIGS. 21-27, as mentioned earlier, the automotive transmission 1 according to the exemplary embodiment may select a transmission mode using the mode change button 710 provided in the cover 700. For example, when the second transmission mode is selected using the mode change button 710, the knob 100, the lever 200, and the lever coupling unit 300 may be moved down to the second position along the first direction due to the driving of the driving unit 400.

Specifically, when the actuator 410 is driven, a driving force of the actuator 410 may be transmitted to the lead screw 430 via the transmission gear portion 420, thereby rotating the lead screw 430. Since the lead screw 430 is engaged with the threaded portion 332a of the moving protrusion 332, the moving protrusion 332 may be moved down due to the rotation of the lead screw 430. As the moving protrusion 332 descends in the first direction, the moving body 330 as well as the bullet portion 310 and the multi-groove portions 320 mounted on the moving body 330 may also descend.

When the moving body 330 descends, the rod portion 510 that protrude in the second direction from the rod assembly may also descend, and the coupling member 520 formed at an end of the rod portion 510 may be decoupled from the coupling groove 531b of the roller portion 530 disposed at the first position. In addition, the rod portion 510 may be separated from the roller portion 530 and then placed at the second position, and the second end of the lever 200 may be inserted into the insertion groove formed in an upper portion of the lead screw 430. Accordingly, unlike in the first transmission mode described above, the bullet portion 310 may be rotated about the first direction, but the rotation of the bullet portion 310 about the second direction may be restricted. In other words, the bullet portion 310 may be rotated about the second rotational axis Ax2, but its rotation about the first rotational axis Ax1 may be restricted.

When the bullet portion 310 is rotated about the second rotational axis Ax2, the knob 100 and the lever 200 may also be rotated about the second rotational axis Ax2 but may be prevented from rotating about the first rotational axis Ax1. In other words, the knob 100 may be rotated about the second rotational axis Ax2 of the vehicle to change the gear position. When the bullet portion 310 is rotated about the second rotational axis Ax2, the bullet portion 310 may be rotated clockwise or counterclockwise in a horizontal direction in the second rotation space of the moving body 330, and each end of the bullet portion 310 may be moved clockwise or counterclockwise along the second shift contact surface 3212a of the second shift body 3212 of a corresponding multi-groove portion 320 while contacting the second shift contact surface 3212a. Since a plurality of stepped surfaces are formed in the first direction in the second shift contact surface 3212a, when the bullet portion 310 moves across the stepped surfaces, a change in force may occur due to the elastic force of the bullet portion 310 in each shift section, thereby generating a feeling of operation. For example, the gear position may be changed to the N position and the R position as the bullet portion 310 is moved to the left from the home position HP of the multi-groove portion 320 along the stepped surfaces formed in the first direction. On the contrary, the gear position may be changed to the D position as the bullet portion 310 is moved to the right from the home position HP of the multi-groove portion 320 along the stepped surfaces formed in the first direction.

In addition, the magnet 610 formed on the surface of the circular head 521 may be disposed adjacent to the second sensor 630 mounted in the housing 10 at the second position. When a gear position is selected, the magnet 610 may be moved clockwise or counterclockwise, and the second sensor 630 may sense a change in the magnetic force of the magnet 610. The sensed value from the second sensor 630 may be transmitted to the controller (not illustrated) to cause a control signal to be transmitted to the transmission to change the gear position to the selected gear position.

An automotive transmission of the present disclosure described above provides at least one of the following advantages. An automotive transmission according to an exemplary embodiment of the present disclosure may provide various operation modes to allow a driver to select and use a desired operation mode based on vehicle driving conditions or personal preference. Therefore, the convenience of the driver may be improved. In addition, the automotive transmission according to the exemplary embodiment may implement a joystick mode and a rotary mode using one multi-groove member. Therefore, the number of components and the cost of components may be decreased, and manufacturability may be improved.

However, the effects of the exemplary embodiments are not restricted to the ones set forth herein. The above and other effects of the exemplary embodiments will become more apparent to one of ordinary skill in the art to which the present disclosure pertains by referencing the claims.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation. The scope of the present disclosure is defined by the following claims, rather than by the above-described detailed description. The meanings and scope of the claims, and all modifications or modified shapes, which are derived from equivalent concepts thereof, should be understood as being included in the scope of the present disclosure.

What is claimed is:

1. An automotive transmission comprising:
   a knob;
   a lever coupled to the knob and configured to be moved up or down along a first direction between a first position and a second position;
   a lever coupling unit coupled to the lever, moved together with the lever when the lever is moved along the first direction, and operated in a first transmission mode at the first position and operated in a second transmission mode at the second position; and
   a driving unit configured to provide a driving force to move the lever coupling unit,
   wherein the lever coupling unit comprises:
   a bullet portion; and
   a multi-groove portion which includes a first shift portion and a second shift portion that contact the bullet portion,
   wherein the bullet portion is operated on the first shift portion at the first position and operated on the second shift portion at the second position.

2. The automotive transmission of claim 1, wherein the multi-groove portion forms a body including portions that intersect in the first direction and a second direction perpendicular to the first direction.

3. The automotive transmission of claim 2, wherein the body comprises:
   a first shift body which extends in the first direction and forms the first shift portion on an inside of the first shift body; and
   a second shift body which extends in the second direction from the first shift body and forms the second shift portion on an inside of the second shift body.

4. The automotive transmission of claim 3, wherein the first shift portion has a predetermined curvature along the first direction on the inside of the first shift body and forms a first shift contact surface which includes a plurality of stepped surfaces formed in the second direction, and
wherein the second shift portion has a predetermined curvature along the second direction on the inside of the second shift body and includes a plurality of stepped surfaces formed in the first direction to form a second shift contact surface that the bullet portion contacts.

5. The automotive transmission of claim 4, wherein the first shift portion is formed in a 'V' shape in the first direction on the inside of the first shift body to form the first shift contact surface, and the second shift portion is formed in a 'V' shape in the second direction on the inside of the second shift body to form the second shift contact surface.

6. The automotive transmission of claim 5, wherein the lever is rotated about the second direction at the first position in the first transmission mode and is rotated about the first direction at the second position in the second transmission mode.

7. The automotive transmission of claim 6, wherein the bullet portion is moved along the first shift contact surface while contacting the first shift contact surface in the first transmission mode and is moved along the second shift contact surface while contacting the second shift contact surface in the second transmission mode.

8. The automotive transmission of claim 7, further comprising a rotation restricting member which is rotated about the second direction while restricting the rotation of the lever coupling unit about the first direction when the lever coupling unit is disposed at the first position and operated in the first transmission mode.

9. The automotive transmission of claim 8, wherein the rotation restricting member comprises:
a rod portion which protrudes in the second direction at a point where the lever and the bullet portion intersect and has a coupling member formed at an end thereof; and
a roller portion which forms a coupling groove for accommodating the coupling member in a surface and is rotatable about the rod portion and about the second direction while the rotation of the roller portion about the first direction is restricted.

10. The automotive transmission of claim 9, wherein the coupling member comprises:
a circular head; and
a seating protrusion which protrudes from the circular head along a diameter of the circular head and makes a surface-contact to at least a portion of an inner surface of the coupling groove.

11. The automotive transmission of claim 10, further comprising a sensing unit which senses the position of the lever and a change in the lever.

12. The automotive transmission of claim 11, wherein the sensing unit comprises:
a magnet coupled to a mounting groove formed in a surface of the circular head; and
a first sensor which senses a change in a magnetic force from the magnet in the first transmission mode.

13. The automotive transmission of claim 11, wherein the sensing unit comprises:
a magnet which is coupled to a mounting groove formed in a surface of the circular head; and
a second sensor which senses a change in a magnetic force from the magnet in the second transmission mode.

14. The automotive transmission of claim 1, wherein the lever coupling unit further comprises:
a moving body coupled to the lever and moved together with the lever when the lever is moved along the first direction,
wherein the bullet portion and the multi-groove portion are mounted on a first surface of the moving body, and the driving unit is connected to a second surface of the moving body.

15. The automotive transmission of claim 14, wherein the moving body includes a seating portion, on which the bullet portion and the multi-groove portion are seated and which forms a space for rotating the bullet portion about the second direction or about the first direction, on the first surface of the moving body.

16. The automotive transmission of claim 15, wherein the seating portion comprises:
a seating groove formed at a center of the moving body in a third direction to accommodate the bullet portion; and
coupling grooves formed at both ends of the seating groove and at both ends of the moving body, wherein the multi-groove portion is coupled to each of the coupling grooves.

17. The automotive transmission of claim 16, wherein the seating groove forms a first rotation space in which the bullet portion is configured to be rotated about the second direction of the lever and a second rotation space in which the bullet portion is configured to be rotated about the first direction of the lever.

18. The automotive transmission of claim 14, wherein the driving unit comprises:
an actuator;
a lead screw configured to be engaged with the lever coupling unit; and
at least one transmission gear portion which transmits a driving force of the actuator to the lead screw.

19. The automotive transmission of claim 18, wherein a moving protrusion is formed on the second surface of the moving body,
wherein the moving protrusion includes a threaded surface, which is configured to be engaged with the lead screw, on an inside of the moving protrusion, and
wherein the moving protrusion is configured to be moved up or down along the first direction based on a rotational direction of the lead screw.

* * * * *